(12) United States Patent
Niamut et al.

(10) Patent No.: US 11,528,538 B2
(45) Date of Patent: Dec. 13, 2022

(54) STREAMING VOLUMETRIC AND NON-VOLUMETRIC VIDEO

(71) Applicants: Koninklijke KPN N.V., Rotterdam (NL); Nederlandse Organisatie Voor Toegepast-Natuurwetenschappelijk Onderzoek TNO, S-Gravenhage (NL)

(72) Inventors: Omar Aziz Niamut, Vlaardingen (NL); Emmanuel Thomas, Delft (NL); Sylvie Dijkstrasoudarissanane, 'S-Gravenhage (NL)

(73) Assignees: Koninklijke KPN N.V., Rotterdam (NL); Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/414,602

(22) PCT Filed: Dec. 17, 2019

(86) PCT No.: PCT/EP2019/085599
§ 371 (c)(1),
(2) Date: Jun. 16, 2021

(87) PCT Pub. No.: WO2020/127226
PCT Pub. Date: Jun. 25, 2020

(65) Prior Publication Data
US 2022/0141548 A1    May 5, 2022

(30) Foreign Application Priority Data
Dec. 21, 2018   (EP) ..................................... 18215425

(51) Int. Cl.
*H04N 21/81*   (2011.01)
*H04N 21/2343*   (2011.01)
(Continued)

(52) U.S. Cl.
CPC ......... *H04N 21/816* (2013.01); *H04N 21/235* (2013.01); *H04N 21/23439* (2013.01); *H04N 21/4312* (2013.01); *H04N 21/8456* (2013.01)

(58) Field of Classification Search
None
See application file for complete search history.

(56) References Cited

U.S. PATENT DOCUMENTS 9,485,492 B2    11/2016  Tian et al.
10,771,763 B2 *  9/2020  Zavesky ............ H04N 21/8146
(Continued)

FOREIGN PATENT DOCUMENTS

WO    WO 2017/153775    9/2017

OTHER PUBLICATIONS

"First idea on Systems technologies for Point Cloud Coding", 11. MPEG Meeting; Apr. 16, 2018-Apr. 20, 2018; San Diego; (Motion Picture Expert Group or ISO/IEC JTC1/SC29/2G11), No. N17675, May 1, 2018, 6 pages.

(Continued)

*Primary Examiner* — Alexander Q Huerta
(74) *Attorney, Agent, or Firm* — McDonnell Boehnen Hulbert & Berghoff LLP

(57) ABSTRACT

A processor system and computer-implemented method are provided for generating a composite video stream which may include a non-volumetric video and a volumetric video, at least part of which is to be displayed in front of the non-volumetric video. The volumetric video may be included in the composite video stream in the form of a non-volumetric representation of the volumetric video, for example inserted into a spatial subregion of the non-volumetric video which may be occluded by the volumetric video during display. The encoding, transmission and decoding may thus not have to be modified to support volumetric (Continued)

video. Signaling data may be provided which may be indicative of the composite video stream containing the non-volumetric representation of the volumetric video. A processor system and computer-implemented method may be provided for rendering the composite video stream using the signaling data.

18 Claims, 9 Drawing Sheets

(51) Int. Cl.
*H04N 21/235* (2011.01)
*H04N 21/431* (2011.01)
*H04N 21/845* (2011.01)

(56) References Cited

U.S. PATENT DOCUMENTS

| | | | |
|---|---|---|---|
| 10,819,946 B1* | 10/2020 | Tanumihardja | G09B 19/003 |
| 2011/0181693 A1* | 7/2011 | Lee | H04N 21/4345 |
| | | | 348/E13.001 |
| 2012/0320169 A1 | 12/2012 | Bathiche | |
| 2017/0236329 A1* | 8/2017 | Harvey | H04N 21/8146 |
| | | | 709/204 |
| 2017/0336705 A1* | 11/2017 | Zhou | G06T 3/0062 |
| 2017/0339391 A1* | 11/2017 | Zhou | H04N 13/161 |
| 2018/0091791 A1 | 3/2018 | Jiang et al. | |
| 2019/0166410 A1* | 5/2019 | Kirk | H04N 21/234363 |
| 2019/0230317 A1* | 7/2019 | Sheftel | G06T 19/003 |

OTHER PUBLICATIONS

Schwarz et al; "Nokia's response to CfP for Point Cloud Compression (Category 2)", 120. MPEG Meeting Oct. 23, 2017-Oct. 27, 2017; Macau; (Motion Picture Expres Group or ISO/IEC JTC1/SC29/2G11), No. m41779, Oct. 17, 2017, 22 pages.
Daisuke Ochi et al; "Live streaming system for omnidirectional video", 2015 IEEE Virtual Reality (VR 2015) Arles, France; Mar. 23-27, 2015, Mar. 1, 2015, pp. 349-350, 2 pages.
European Search Report dated Feb. 27, 2019 for European Application No. 18 21 5425, 2 pages.
Extended European Search Report dated Mar. 6, 2019 for European Application No. 18 215 425.2, 6 pages.
Prins et al; Togethervr: A Framework for Photo-Realistic Shared Media Experiences in 360-Degree VR, 2017, Conference Paper, Sep. 2017; 9 pages.
Chou; "Holograms are the Next Video", 8i Labs, Inc., ACM Multimedia Systems Conference, Jun. 13, 2018, 74 pages.
International Search Report and Written Opinion dated Jan. 16, 2020 for International Application No. PCT/EP2019/085599,15 pages.
Misra et al; "An Overview of tiles in HEVC", IEEE Journal of Selected Topics in Signal Processing, vol. 7, No. 6, Dec. 2013, pp. 969-977.
MPEG; "Point Cloud Compression", https://mpeg.chiariglione.org/standards/mpeg-i/point-cloud-compression.
Y. Sanchez, R. Globisch, T. Schierl and T. Wiegand, "Low Complexity Cloud-video-Mixing Using HEVC" CCNC, No. 11, pp. 213-218, 2014.
Amon et al., "Compressed Domain Stitching of HEVC Streams for Video Conferencing Applications", Proceedings of 2012 IEEE 19th International Packet video Workshop, May 10-11, 2012, Munich, Germany, 5 pages.
S. Schwarz et al., "Emerging MPEG Standards for Point Cloud Compression", IEEE Journal on Emerging and Selected Topics in Circuits and Systems. Dec. 2018.
C. Perra and D. Giusto, "Raw light field image compression of sliced lenslet array", 2017 IEEE International Symposium on Broadband Multimedia Systems and Broadcasting (BMSB), pp. 1-5, 2017.
T. Rhee, L. Petikam, B. Allen and A. Chalmers, "MR360: Mixed Reality Rendering for 360° Panoramic Videos," IEEE Transactions on Visualization and Computer Graphics, vol. 23, No. 4, pp. 1379-1388, 2017.
A. Jeworutzki, "XNA 4 tutorial: Frustum Culling and Occlusion Culling," Mar. 1, 2011. [Online], Available: http://www.andrejeworutzki.de/game-developement/xna-4-tutorial-frustum-and-occlusion-culling/.
J. O'Rourke, Art Gallery Theorems and Algorithms, Oxford University Press, 1987.
Folden, "Adding 3D Assets To A 360 Virtual Reality (VR) Video Scene: Case Study," Gravity Jack, Mar. 7, 2017. [Online]. Available: https://gravityjack.com/news/adding-3d-assets-360-vr-video-case-study/.
Carbotte, "Unity Can make Your 360-Degree video Pop With Animations, Volumetric Lighting, Interactivity", Tom's Hardware, May 2, 2017.
Schwarz et al., "3D Video Coding Using Advanced Prediction, Depth Modeling, and Encoder Control Methods", 2012 Picture Coding Symposium; May 7-9, 2012, Krakow, Poland, 4 pages.
Hosseini et al., "Adaptive 360 VR Video Streaming based on MPEG-DASH SRD", Jan. 23, 2017, 2 pages.
Cozzi, "Introducing 3D Tiles", Aug. 10, 2015, 12 pages.
Mathew, "Why is Occlusion in Augmented Reality So Hard?", Jan. 28, 2018, 21 pages.
Murase et al., "Correct Occlusion Effect in the Optical See-through Immersive Augmented Reality Display System", 18th International Conference on Artificial Reality and Telexistence 2008, 8 pages.
Kiyokawa et al., "An Occlusion-Capable Optical See-through Head Mount Display for Supporting Co-located Collaboration", Proceedings of the Second IEEE and ACM International Symposium on Mixed and augmented Reality (ISMAR 03), 9 pages.
Gauthier Lafruit, Arnaud Schenkel, Christian Tulvan, Marius Preda, Lu Yu, "MPEG-I Coding Performance in Immersive VR/AR Applications," IBC2018, Sep. 2018.

* cited by examiner

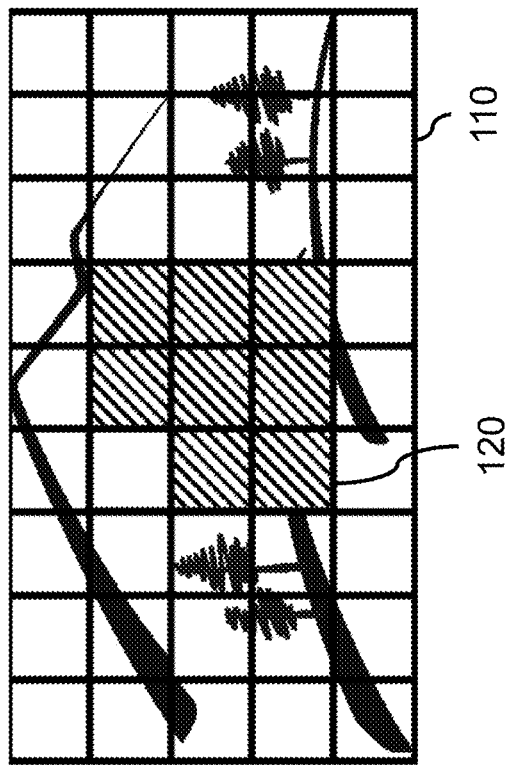
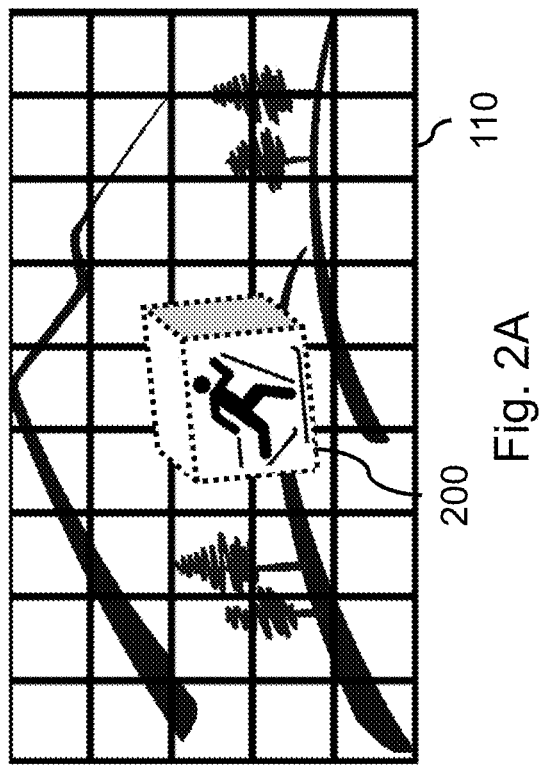

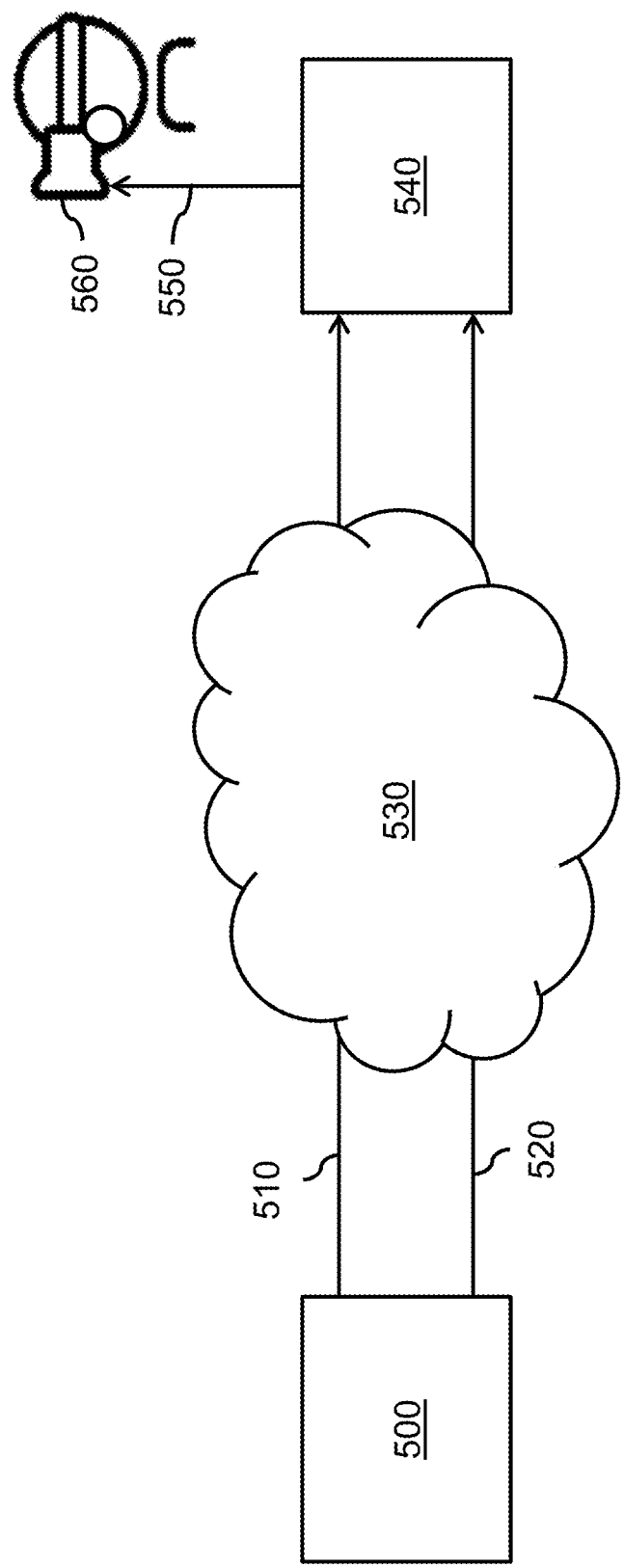

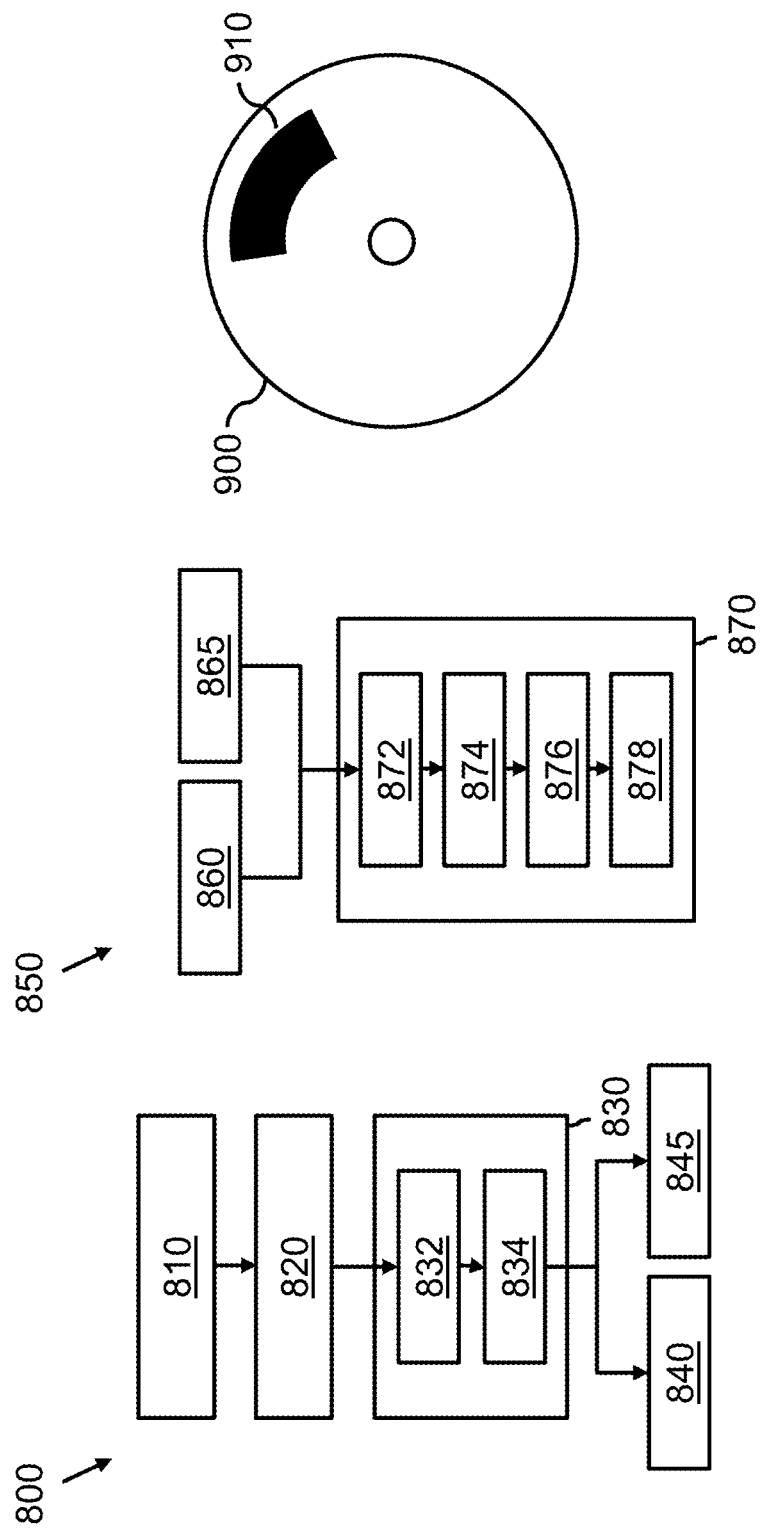

STREAMING VOLUMETRIC AND NON-VOLUMETRIC VIDEO

CROSS REFERENCE TO RELATED APPLICATIONS

The present application is a national stage entry of, and claims priority to, PCT/EP2019/085599, filed on Dec. 17, 2019, which claims priority to European Patent Application EP 18215425.2, filed in the European Patent Office on Dec. 21, 2018, both of which are hereby incorporated in their entirety herein by reference.

FIELD OF THE INVENTION

The invention relates to a method and processor system for generating a composite video stream for being displayed by a client device, for example in an Augmented Reality or Virtual Reality environment. The invention further relates to a computer readable medium comprising signaling data for use in generating the composite video stream. The invention further relates to a method and a processor system representing a client device for rendering the composite video stream. The invention further relates to a computer program for carrying out either method.

BACKGROUND ART

It may be desirable to transmit a volumetric video and a non-volumetric video to a client device for simultaneous display by the client device.

Such a scenario may, for example, occur in the fields of Virtual Reality (VR) and Augmented Reality (AR). Here, VR involves the use of computer technology to simulate a user's physical presence in a virtual environment, while AR refers to the use of computer technology to augment a user's view of the physical real-world environment by overlaying a virtual environment over, or in another manner combining the virtual environment with the user's view of the physical real-world environment. Typically, VR and/or AR rendering devices make use of Head Mounted Displays (HMD) to render the virtual environment to the user, although particularly in VR, other types of displays and rendering techniques may be used as well, including but not limited to holography and Cave automatic virtual environments (recursive acronym CAVE).

VR/AR may be used to render scenes which are represented by three-dimensional (3D) graphics, e.g., defined as a set of vertices, edges, faces, etc.

However, in many cases, it may be desirable to establish a video-based representation of a scene in VR. For example, the video may be a video recording of a real-life scene, or a video obtained by Computer-Generated Imagery (CGI) of a virtual scene, etc. In some cases, the video may represent a panoramic or omnidirectional video which may provide a large field of view of the scene, e.g., allowing a user to 'look around' within the scene. The rendering of such a video-based representation of a scene may involve displaying the image data of the video on the inside of a virtual body, such as a sphere, and then rendering from a viewpoint within or facing the virtual body. For example, in a multiuser communication session in VR, which is also referred to as 'Social VR', an omnidirectional video of a tropical island may be used as a 'virtual backdrop' for the multiuser communication session by projecting the video onto the inside of a sphere and placing avatars representing the users of the multiuser communication session inside the sphere, thereby providing each user with a view of the other participants on the tropical island. See for example ill which describes such a 'Social VR' use-case, albeit for an image-based instead of video-based backdrop.

The video is typically a 2D video, or a stereoscopic 3D video which is recorded and intended to be viewed from a particular viewpoint. However, for a more immersive experience in both AR and VR, a viewer may desire six degrees of freedom (6DoF). That is, when for example wearing a head-mounted AR or VR display, the viewer may experience changes in the environment when moving his/her head in all directions, e.g., when changing head position forward/backward (surge), up/down (heave) and left/right (sway) combined with changes in orientation through rotation.

It is known that volumetric 3D video may provide a viewer with a 6DoF experience. Examples of volumetric 3D video formats, which are in the following also simply referred to as volumetric video formats, are for example described in [2], and may include Gabor holograms, light fields, point clouds and other video formats.

However, volumetric videos are not yet widely distributed, neither in the domain of VR/AR nor in other domains, in part due to a limited availability of suitable source material (e.g., camera recordings and/or depth registrations, e.g., by a depth sensor or laser) but also due to technical considerations, for example since a volumetric video may represent a large amount of data and may thereby require significant storage, bandwidth and encoding and decoding capabilities.

For such and similar reasons, it may be desirable to use a combination of 2D video or stereoscopic 3D video (henceforth jointly referred to as 'non-volumetric' video) with one or more select instances of volumetric video. Such instances of volumetric video may represent 3D objects of interest. For example, in the aforementioned use-case of a multiuser communication session, the avatars of participants may instead be represented by a volumetric capture of each participant, e.g., as may be obtained using a 3D sensor camera such as the Microsoft Kinect.

A specific example of volumetric video may be a 3D point cloud video. In general, a point cloud may be defined as a set of data points in a coordinate system, and is typically used to measure and represent physical world surfaces. Usually, a 3D point cloud is defined in a Cartesian coordinate system, e.g., with a X-, Y- and Z-coordinate. A time-series of such 3D point clouds may also be simply referred to as a 3D point cloud video. Such 3D point cloud videos may be in color, in that points may be assigned a color attribute, e.g., a luminance and a chrominance value.

Compression techniques may be applied to volumetric videos to reduce the amount of data to be stored, transmitted, etc. For example, for 3D point clouds, so-called Point Cloud Compression (PCC) [3] may be used. However, PCC and similar techniques are currently not optimized for streaming, e.g., from a server to a client device. Additionally, a client device may now receive multiple compressed and encoded data streams, namely a bitstream representing the non-volumetric video and separately a bitstream representing the volumetric video. It may be challenging for the client device to receive and decode multiple bitstreams simultaneously. For example, the decoding of a volumetric video stream may be more computationally complex, e.g., as it may have to be performed in software instead of relying on hardware support, e.g., dedicated Graphics Processing Unit (GPU) support. Such hardware support typically is available for decoding non-volumetric video. A related problem may be the relatively large bandwidth required to transmit both bitstreams.

REFERENCES

[1] M. J. Prins, S. Gunkel and O. Niamut, "*TogetherVR: A Framework for Photo-Realistic Shared Media Experiences in* 360-*Degree VR*" in International Broadcasting Conference, 2017.
[2] Philip A. Chou, "*Holograms are the Next Video*" in Proceedings of the 9th ACM Multimedia Systems Conference, 2018.
[3] MPEG Point Cloud Compression (PCC group): https://mpeg.chiariglione.org/standards/mpeg-i/point-cloud-compression

SUMMARY OF THE INVENTION

It would be advantageous to enable streaming a non-volumetric video and a volumetric video to a client device at a reduced bandwidth, for example compared to the streaming of a separate non-volumetric video stream and a separate volumetric video stream. Additionally or alternatively, it would be advantageous to enable a client device to decode a non-volumetric video and a volumetric video at a reduced computational complexity, for example compared to the decoding of a separate non-volumetric video stream and a separate volumetric video stream.

The following measures may be based on the consideration that encoding, streaming and decoding techniques for non-volumetric video may be considered mature and optimized, while such techniques for volumetric video may be still emerging. In addition, it is considered that a volumetric video may be typically displayed in front of a non-volumetric video, such as in the aforementioned 'Social VR' example in which a volumetric video recording of a user may be displayed in front of a non-volumetric video representing the 'virtual backdrop' of the scene.

In accordance with a first aspect of the invention, a processor system is provided which may be configured for generating a composite video stream for transmission to a client device. The processor system may comprise:
  a network interface to a network;
  an input interface for obtaining:
    a non-volumetric video; and
    a volumetric video, at least part of which is to be displayed by the client device in front of the non-volumetric video;
  a processor which may be configured to:
    determine a spatial subregion of the non-volumetric video which is partially or entirely occluded when the volumetric video is displayed by the client device in front of the non-volumetric video; and
    generate a composite video for the client device by, for respective input frames of the non-volumetric video and the volumetric video:
      obtaining a non-volumetric representation of the volumetric video which is generated using a conversion technique which allows the volumetric video to be reconstructed from the non-volumetric representation:
      replacing data of the spatial subregion of the non-volumetric video by data of the non-volumetric representation of the volumetric video, thereby obtaining an output frame of the composite video;
    and via the network interface:
      stream the composite video as a composite video stream, or stream select spatial segments of the composite video stream, to the client device; and
      provide signaling data to the client device which is indicative of the composite video stream containing the non-volumetric representation of the volumetric video.

In accordance with a further aspect of the invention, a computer-implemented method is provided which may generate a composite video stream for transmission to a client device. The method may comprise:
  obtaining:
    a non-volumetric video; and
    a volumetric video, at least part of which is to be displayed by the client device in front of the non-volumetric video;
  determining a spatial subregion of the non-volumetric video which is partially or entirely occluded when the volumetric video is displayed by the client device in front of the non-volumetric video;
  generating a composite video for the client device by, for respective input frames of the non-volumetric video and the volumetric video:
    obtaining a non-volumetric representation of the volumetric video which is generated using a conversion technique which allows the volumetric video to be reconstructed from the non-volumetric representation;
    replacing data of the spatial subregion of the non-volumetric video by data of the non-volumetric representation of the volumetric video, thereby obtaining an output frame of the composite video;
  streaming the composite video as a composite video stream, or streaming select spatial segments of the composite video stream, to the client device; and
  providing signaling data to the client device which is indicative of the composite video stream containing the non-volumetric representation of the volumetric video.

In accordance with a further aspect of the invention, a processor system is provided which may represent a client device configured to render a volumetric video in front of a non-volumetric video. The processor system may comprise:
  a network interface to a network;
  a processor which may be configured to, via the network interface:
    receive a composite video stream containing the non-volumetric video, or select spatial segments of the composite video stream;
    receive signaling data which is indicative of the composite video stream containing a non-volumetric representation of the volumetric video in a spatial subregion of the non-volumetric video;
  wherein the processor may be configured to render the composite video stream by, for a respective input frame of the composite video stream:
    decoding the composite video stream, or the select spatial segments of the composite video stream;
    on the basis of the signaling data, identifying the non-volumetric representation of the volumetric video in the input frame;
    reconstructing the volumetric video from the non-volumetric representation of the volumetric video using a reconstruction technique; and
    rendering the volumetric video in front of the non-volumetric video so that the spatial subregion of the non-volumetric video is partially or entirely occluded by the volumetric video.

In accordance with a further aspect of the invention, a computer-implemented method is provided which may render a volumetric video in front of a non-volumetric video. The method may comprise:

receiving a composite video stream containing the non-volumetric video, or select spatial segments of the composite video stream;

receiving signaling data which is indicative of the composite video stream containing a non-volumetric representation of the volumetric video in a spatial subregion of the non-volumetric video;

rendering the composite video stream by, for a respective input frame of the composite video stream:

decoding the composite video stream, or the select spatial segments of the composite video stream;

on the basis of the signaling data, identifying the non-volumetric representation of the volumetric video in the input frame;

reconstructing the volumetric video from the non-volumetric representation of the volumetric video using a reconstruction technique; and rendering the volumetric video in front of the non-volumetric video so that the spatial subregion of the non-volumetric video is partially or entirely occluded by the volumetric video.

In accordance with a further aspect of the invention, a transitory or non-transitory computer-readable medium is provided comprising a computer program. The computer program may comprise instructions for causing a processor system to perform either or both computer-implemented methods.

The above measures may involve generating a composite video stream for a client device. The composite video stream may combine a volumetric video and a non-volumetric video into one stream. The volumetric video may, at least in part, be displayed by the client device in front of the non-volumetric video. Here, the term 'in front' may refer to a relative display of the volumetric video and the non-volumetric video which causes a part of the non-volumetric video to be partially or entirely occluded when the volumetric video and the non-volumetric video are both displayed by the client device. For example, a volumetric video recording of a user may be displayed in front of, and thereby fully or to a certain degree occlude part of, the non-volumetric video representing the 'virtual backdrop' of a scene. Here, the term 'to a certain degree' may refer to an occlusion which locally reduces the visibility of the underlying non-volumetric data, e.g., due to transparency of the volumetric video.

The above measures may further involve determining the spatial subregion of the non-volumetric video which is partially or entirely occluded when the volumetric video is displayed by the client device in front of the non-volumetric video. For example, the spatial subregion may be determined based on signaling data received from the client device, or the processor system generating the composite video stream may inherently be aware of such information, e.g., by the processor system itself prescribing the relative display positions of the non-volumetric video and the volumetric video to the client device, e.g., due to the processor system acting as an orchestrator.

The above measures may further involve generating a non-volumetric representation of the volumetric video using a conversion technique which allows the volumetric video to be reconstructed from the non-volumetric representation. Such conversion techniques are known per se. For example, a 3D point cloud video may be converted to a non-volumetric (2D) video using a conversion technique known as patch-based point cloud compression. Such type of conversions may generally allow the volumetric video to be reconstructed from its non-volumetric representation, either perfectly (e.g., lossless reconstruction) or imperfectly (e.g., lossy reconstruction), for example by applying a technique which is conceptually inverse to the conversion technique, the former being also referred to as a 'reconstruction technique'. In some embodiments, the non-volumetric representation of the volumetric video may have been generated by another entity, e.g., a capture device, and the non-volumetric representation of the volumetric video may then be accessed by the processor system. Such generating or accessing of the non-volumetric representation of the volumetric video may be jointly referred to as 'obtaining' said non-volumetric representation.

The non-volumetric representation of the volumetric video may then be inserted into the non-volumetric video, namely by replacing data in the previously identified spatial subregion of the non-volumetric video by data of said non-volumetric representation of the volumetric video. Effectively, data of the non-volumetric representation may replace the data of a part of the non-volumetric video which may not be visible to a user anyway as it will be entirely or partially occluded by the volumetric video during display. The existing image data in this spatial subregion may thus be replaced by some or all of data of the non-volumetric representation without significant detriment to the subsequent display of the non-volumetric video. In some embodiments, such replacement may comprise inserting of the data of the non-volumetric representation of the volumetric video in the spatial subregion of the non-volumetric video. Such insertion may involve replacing the existing image data of the non-volumetric video in the spatial subregion by the data of said non-volumetric representation, for example on a pixel-by-pixel, block-by-block or segment-by-segment basis. An example of a replacement on a segment-by-segment basis is a replacement on a tile-by-tile basis. In other embodiments, the data of the non-volumetric in the spatial subregion may be removed, and the data of the non-volumetric representation of the volumetric video may be added elsewhere to the non-volumetric video.

If the non-volumetric representation of the volumetric video is inserted into the spatial subregion of the non-volumetric video. e.g., as 'inserted data', this inserted data as such may not be visible during the subsequent display of the non-volumetric video as the spatial subregion of the non-volumetric video may be entirely or partially occluded by the volumetric video which is reconstructed from the inserted data.

In general, the data of the non-volumetric representation of the volumetric video may not be recognizable by the user as representing the volumetric video, but may be inserted as if it were image data.

Alternatively, if the video format of the non-volumetric video, or the video format of the resulting composite video or composite video stream, supports layers or conceptually similar techniques, the data of the non-volumetric representation may be inserted as a layer overlaying the original image data in the spatial subregion.

By performing the insertion, e.g., on a frame-by-frame basis, a composite video may be obtained, which may be considered a non-volumetric composite video as it contains the non-volumetric video and the non-volumetric representation of the volumetric video, and which may be streamed to the client device in the form of a composite video stream. For that purpose, the composite video may be encoded to obtain the composite video stream. Alternatively, the non-volumetric video and the non-volumetric representation of the volumetric video may be separately encoded, and the composite video stream may be generated by combining both encodings, e.g., on a segment-by-segment basis in case of so-called spatially segmented encodings.

The composite video stream may then be streamed to the client device, either in its entirety or as select spatial segments, e.g., only those which are visible to a user of the client device given the users current field of view ('viewport'), e.g., in a VR environment. The latter concept is also known in VR as 'Viewport-Adaptive Streaming' (VAS). A specific example of VAS is 'tiled streaming'. In general, the term 'select' when referring to the spatial segments may refer to 'one or more' of the spatial segments.

Additionally, signaling data may be provided to the client device which may be indicative of the composite video stream containing the non-volumetric representation of the volumetric video. For example, the signaling data may identify the fact that the composite video stream contains data of the non-volumetric representation of the volumetric video, and if the data is specifically inserted into the spatial sub-region, identify the spatial subregion itself and/or the used conversion technique.

Compared to a client device having to receive at least two separate video streams, e.g., a non-volumetric video stream and a volumetric video stream, the above measures may provide one or more advantages to the client device. For example, the client device may only have to decode the composite video stream and thereby fewer video streams. This may provide compatibility with client devices having only one hardware decoder. Moreover, by converting the volumetric video to a non-volumetric representation thereof, the volumetric video may be encoded, transmitted and decoded as if it were a 'conventional' non-volumetric video, e.g., a 2D video. The encoding, transmission and decoding, or in general a used video workflow or video pipeline, may thus not have to be modified to support volumetric video. Rather, it may suffice for the encoding side to be able to convert the volumetric video to the non-volumetric representation before encoding, and for the client device to be able to reconstruct the volumetric video from the non-volumetric representation after decoding. Moreover, the composite video stream may omit the parts of the non-volumetric video which are occluded by the volumetric video, and may thus be smaller in size than a non-volumetric video stream and an additional volumetric video stream (as the former contains image data which is or will be occluded by the latter when displayed, e.g., in a VR environment). This may reduce the computational complexity of decoding and bandwidth and storage requirements for receiving and buffering. Moreover, if there are several volumetric videos which are inserted centrally by an entity, such as the aforementioned processor system, the client device would only need to receive and decode the composite video stream instead of having to receive and decode the volumetric video streams separately, possibly from different entities.

The bandwidth advantages may also apply to the (access) network by which the composite video stream is transmitted to the client device.

In this respect, it is noted that, in general, not all of the volumetric video may be inserted into the non-volumetric video, but rather only a part of the volumetric video, which may be a substantial part. Any references to 'conversion', 'insertion', 'render', etc. of the volumetric video is to be understood as including said actions applied to only a (substantial) part of the volumetric video. For example, if a volumetric video contains a volumetric recording of a user of a multiuser communication session and his/her immediate surroundings, only the data representing the user may be inserted into the non-volumetric video while omitting inserting the data of his/her surroundings.

In general, the volumetric video may be considered a 'foreground video' and the non-volumetric video may be considered a 'background video' as the volumetric video may be displayed in front of the non-volumetric video by the client device. However, the terms 'foreground' and 'background' are not technically limiting with respect to the (semantic) content of the respective videos, but rather refer to a display order in that the foreground video is to be displayed 'in front of' the background video. For example, a background video may typically contain the background of a scene, but a background video may also comprise one or more foreground objects. As a specific example, in a VR multiuser communication setting, the background video stream may provide a background of the conference room and a table in the foreground, whereas the foreground video may be a real-time volumetric video of a user that participates in the VR multiuser communication session. Likewise, the volumetric 'foreground' video may itself be partially or entirely occluded by another foreground object, such as another volumetric video, a 3D graphics object, etc. For example, the real-time volumetric video of a user may be partially occluded by a table, e.g., as represented by a 3D graphics object, to convey the impression that the user is seated behind the table.

In the above and following, the term 'rendering' may refer to an operation which may process input data to obtain displayable data. In some embodiments, the input data may not represent displayable data. In other embodiments, the input data may represent displayable data per se, but the rendering may provide another type of displayable data. Such rendering may include, but is not limited to, Central Processing Unit (CPU)-based rendering and Graphics Processing Unit (GPU)-based rendering.

In general, the foreground video may be more dynamic than the background video. Hence, the foreground video may be obtained in real-time, whereas the background video may be pre-recorded. However, this is not a limitation, as the background video may also be obtained in real-time. e.g., live recorded, and/or the foreground video may alternatively be pre-recorded. Both or either video may already be obtained as a video stream, e.g., in a streamable and encoded form.

The following embodiments are described with reference to the computer-implemented method and the processor system for generating the composite video stream, but may denote corresponding embodiments of the computer-implemented method and the processor system for rendering the composite video stream.

In an embodiment, the non-volumetric video may be obtained as, or converted into, a spatially segmented encoding comprising independently decodable segments, and the processor may be configured to:

determine the spatial subregion as a set of segments of the non-volumetric video which are occluded when the volumetric video is displayed by the client device in front of the non-volumetric video;

encode the non-volumetric representation of the volumetric video as one or more independently decodable segments; and remove the set of segments from the spatially segmented encoding of the non-volumetric video, and add the one or more segments to the spatially segmented encoding of the non-volumetric video, to obtain a spatially segmented encoding of the output frame of the composite video stream.

Spatially segmented encoding techniques are known per se. For example, as spatial segments, so-called tiles' may be used which may subdivide a video frame into logically separate rectangular parts that may be decoded independently when decoding a given frame. The tiles may then be requested and streamed individually by a client device on the basis of a so-called manifest. Example of 'tiled streaming' techniques are described in [4] and [5] (see 'Further references'), and may involve describing the relationship between tiles in the form of a Spatial Relationship Description (SRD) or similar data, and including said data in a manifest, such as an MPD (Media Presentation Description). Tiles may then be requested individually by the client device on the basis of the manifest, for example those in a current field of view.

If the non-volumetric video is obtained as, or converted into, a spatially segmented encoding, the subsequent insertion of the data of the non-volumetric representation of the volumetric video may be less computationally complex. Namely, specific spatial segments of the non-volumetric video may be identified which may be partially or entirely occluded by the volumetric video. The spatial segments which are entirely occluded may then be removed from the spatially segmented encoding of the non-volumetric video, and the spatial segments representing the non-volumetric representation of the volumetric video may be added instead.

It is noted that in some embodiments, this may represent a replacement of segments in the spatially segmented encoding of the non-volumetric video. However, in other embodiments, the number of segments which may be added to the spatially segmented encoding of the non-volumetric video may exceed the number of segments which may be removed from said spatially segmented encoding.

For spatial segments which are only partially occluded, the spatial segment(s) may be decoded, the data of the non-volumetric representation of the volumetric video may be inserted, and the spatial segment(s) may be re-encoded. As such, in some embodiments, only those segments may be removed which are entirely occluded. In other embodiments, only those segments which are at least occluded above a certain degree may be removed, for example 50% of the segment's area.

From the perspective of the processor system generating the composite video stream, the use of a spatially segmented encoding may reduce the computational complexity of the insertion, particularly if the non-volumetric video is already available in such form. Namely, in this case, it may not be needed to decode the entire non-volumetric video, insert the non-volumetric representation of the volumetric video into the non-volumetric video, and encode the resulting composite video. Rather, it may suffice to encode the non-volumetric representation of the volumetric video as one or more spatial segments, and include these segments in the spatially segmented encoding of the non-volumetric video while omitting segments which are occluded.

Since the non-volumetric video may be relatively large, for example providing a 180-degree or 380-degree high-resolution view of a scene, typically only a small part of the segments may have to be processed. This may reduce the computational complexity of the processing, but also the latency caused by the processing. The latter may be particularly relevant if the volumetric video is used for communication purposes, for example when representing a real-time volumetric recording of a user, as latency may disturb the communication between users.

In an embodiment, the processor may be configured to generate the signaling data to identify the set of segments as containing the non-volumetric representation of the volumetric video. For example, the signaling data may contain identifiers of each of said segments. Another example is that the signaling data may contain, for each segment, an identifier denoting the media type of the respective segment, e.g., non-volumetric video, or a non-volumetric representation of a volumetric video. The signaling data may thus identify each segment as either containing part of the non-volumetric video or part of the non-volumetric representation of the volumetric video. The client device may thereby on the basis of the signaling data identify which segments are to be used as input for the reconstruction of the volumetric video.

In an embodiment, the processor may be configured to include the signaling data in the composite video stream, for example as a Supplemental Enhancement Information (SEI) message. By including the signaling data in the composite video stream, there may be no need for a separate signaling channel to the client device.

In an embodiment, the processor may be configured to generate the signaling data by generating or modifying a manifest associated with the composite video stream to identify the set of segments of the composite video stream which contain the non-volumetric representation of the volumetric video.

A non-limiting example of a manifest within the context of MPEG-DASH is an MPD (Media Presentation Description). Other types of manifests are known as well, and may, within the context of spatially segmented streaming, identify the spatial segments available for streaming and their location (e.g., URL, filename, port number, etc.) at which they may be retrieved. Such a manifest may contain additional metadata, and may therefore be generated or modified to identify the set of segments which contain the non-volumetric representation of the volumetric video. Effectively, the manifest may comprise or represent the signaling data as described elsewhere.

In an embodiment, the client device may be configured to render the composite video stream in a Virtual Reality (VR) or Augmented Reality (AR) environment and to render the VR/AR environment from a viewing position of a user, and the processor may be configured to:

determine the viewing position of the user, for example by receiving data indicative of the viewing position from the client device; and determine the spatial subregion by determining which spatial subregion of the volumetric video is partially or entirely occluded by the volumetric video when the volumetric video is displayed in front of the non-volumetric video in the VR/AR environment and rendered by the client device from the viewing position.

The composite video stream may be generated taking into account the viewing position of a user of the client device in a VR/AR environment, for which user the composite video stream is generated. Here and elsewhere, it is to be understood that "of the user" may technically correspond to the provision of a user-adjustable parameter and the provision of a mechanism for the user to adjust said parameter.

The viewing position may be characterized in various ways, e.g., as a 2D or 3D position in the VR/AR environment. If the volumetric video is not to be 'glued' onto the non-volumetric video but rather to be represented in the VR environment as a separate object which is to be placed in front of the object representing the non-volumetric video (e.g., a surrounding sphere), the viewing position may determine which part of the non-volumetric video may be occluded by the volumetric video, and thereby the spatial subregion into which data of the non-volumetric representation of the volumetric video may be inserted. By taking into account the viewing position, it may thus be avoided that the non-volumetric representation of the volumetric video is inserted into a part of the non-volumetric video which would otherwise be visible to the user from his/her viewing position, e.g., not occluded by the volumetric video.

It is noted that the viewing position of the user may be determined in various ways, for example by receiving data indicative of the viewing position from the client device. Such data may be received only once, e.g., before starting to generate the composite video stream, or regularly, e.g., reflecting a current viewing position of the user. However, the viewing position may also be estimated or predetermined, e.g., corresponding to one of a limited number of viewing positions, or simply fixed.

In many cases, the client device may only render a VR/AR environment in a particular field of view (also referred to as 'viewport') which may be smaller than the overall field of view provided by the VR/AR environment, the latter being typically a 360-degree field of view. As parts of the VR/AR environment may not be visible to the user at a given moment in time, this may be taken into account when inserting data of the non-volumetric representation of the volumetric video into the non-volumetric video. In an embodiment, inserting the data of the non-volumetric representation of the volumetric video into the spatial subregion of the non-volumetric video based on the field of view may comprise only inserting the non-volumetric representation of the volumetric video into the spatial subregion of the non-volumetric video if said spatial subregion is in the field of view of the user, or within a vicinity of the field of view.

It is noted that the client device may use 'tiled streaming' or similar viewport-adaptive streaming techniques to only selectively stream one or more spatial segments which are within the field of view (and/or within a narrow 'sideband' around the field of view) of the user. The requested segments may therefore be indicative of the current field of view of the client device.

In an embodiment, the processor system generating the composite video stream may be a network node of a telecommunication network, such as an edge node, e.g., in a 5G or next generation telecommunication network. Such edge nodes of 5G or next generation telecommunication networks may have a (very) low delay to client devices and may be well suited for inserting the non-volumetric representation of the volumetric video into a dynamically changing spatial subregion, for example one which is dependent on a current viewing position of a user of the client device.

The following embodiments are described with reference to the computer-implemented method and the processor system for rendering the composite video stream, but may denote corresponding embodiments of the computer-implemented method and the processor system for generating the composite video stream.

In an embodiment, the composite video stream may be received as a spatially segmented encoding which comprises independently decodable segments, and the processor may be configured to identify the non-volumetric representation of the volumetric video in the composite video stream based on the signaling data identifying a set of segments of the spatially segmented encoding. As also described earlier, the client device may thereby on the basis of the signaling data identify which segments are to be used as input to the reconstruction of the volumetric video.

In an embodiment, the signaling data may be received as part of a manifest associated with the composite video stream. The manifest may identify the set of segments containing the non-volumetric representation of the volumetric video.

In an embodiment, the processor may be configured to render the composite video stream in a Virtual Reality (VR) or Augmented Reality (AR) environment, and render the VR/AR environment from a viewing position of a user. For example, the non-volumetric video may be used as, or displayed onto, a background object in the VR/AR environment, while the volumetric video which may be reconstructed on the basis of the data contained in the composite video stream may be displayed as a foreground object in the VR/AR environment in front of the background.

The following embodiments are described with reference to the computer-implemented method and the processor system for rendering the composite video stream, and with reference to the computer-implemented method and the processor system for generating the composite video stream.

In an embodiment, the volumetric video may be a 3D point cloud, and the conversion technique by which the non-volumetric representation of the volumetric video is generated may be a point cloud compression technique, for example a patch-based point cloud compression technique. Point cloud compression techniques such as patch-based point cloud compression techniques are well suited for converting 3D point clouds into a non-volumetric form, e.g., into 2D image data. In an embodiment, the volumetric video may be a light field, and the non-volumetric representation of the light field may be a grid of 2D videos from which the light field may be reconstructed.

In an embodiment, the non-volumetric video is a panoramic or omnidirectional video. The non-volumetric video may, for example, incorporate a map projection, such as an equirectangular projection or cube-map projection.

The following aspects of the invention and embodiments relate to signaling data, but may denote corresponding embodiments of the computer-implemented method(s) and processor system(s) generating and/or using the signaling data.

In a further aspect of the invention, a transitory or non-transitory computer-readable medium may comprise signaling data which may be associated with a composite video stream containing a non-volumetric video and which may be indicative of the composite video stream containing a non-volumetric representation of a volumetric video in a spatial subregion of the non-volumetric video.

In an embodiment, the composite stream may be a spatially segmented encoding which comprises independently decodable segments, and the signaling data may identify a set of segments of the spatially segmented encoding. As also described earlier, the client device may thereby on the basis of the signaling data identify which segments are to be used as input to the reconstruction of the volumetric video.

In an embodiment, the transitory or non-transitory computer-readable medium may comprise a manifest associated with the composite video stream, and the manifest may identify the set of segments of the spatially segmented encoding which contain the non-volumetric representation of the volumetric video. Effectively, the manifest may comprise or represent the signaling data as described elsewhere.

In accordance with an abstract of the present invention, a processor system and computer-implemented method may be provided for generating a composite video stream which may include a non-volumetric video and a volumetric video, at least part of which is to be displayed in front of the non-volumetric video. The volumetric video may be included in the composite video stream in the form of a non-volumetric representation of the volumetric video, for example inserted into a spatial subregion of the non-volumetric video which may be occluded by the volumetric video during display. The encoding, transmission and decoding may thus not have to be modified to support volumetric video. Signaling data may be provided which may be indicative of the composite video stream containing the non-volumetric representation of the volumetric video. A processor system and computer-implemented method may be provided for rendering the composite video stream using the signaling data.

It will be appreciated by those skilled in the art that two or more of the above-mentioned embodiments, implementations, and/or aspects of the invention may be combined in anyway deemed useful.

Modifications and variations of the method, the processor system(s), the metadata and/or the computer program, which correspond to the modifications and variations described for another one of said entities, can be carried out by a person skilled in the art on the basis of the present description.

FURTHER REFERENCES

[4] Ochi, Daisuke, et al. "*Live streaming system for omnidirectional video*", Virtual Reality (VR), 2015 IEEE.
[5] K. Misra, A. Segall. M. Horowitz, S. Xu and A. Fuldseth, "*An Overview of Tiles in HEVC*" IEEE Journal of Selected Topics in Signal Processing, 2013.
[6] Y. Sanchez, R. Globisch, T. Schierl and T. Wiegand, "*Low Complexity Cloud-video-Mixing Using HEVC*" CCNC, no. 11. pp. 213-218, 2014.
[7] M. S. A. H. Peter Amon, "*Compressed Domain Stitching of HEVC Streams for Video Conferencing Applications*" in International Packet Video Workshop, Munich, 2012.
[8] S. Schwarz et al., "*Emerging MPEG Standards for Point Cloud Compression*", IEEE Journal on Emerging and Selected Topics in Circuits and Systems. December 2018. doi: 10.1109/JETCAS.2018.2885981.
[9] C. Perra and D. Giusto, "*Raw light field image compression of sliced lenslet array*", 2017 IEEE International Symposium on Broadband Multimedia Systems and Broadcasting (BMSB), pp. 1-5, 2017.

BRIEF DESCRIPTION OF THE DRAWINGS

These and other aspects of the invention are apparent from and will be elucidated with reference to the embodiments described hereinafter. In the drawings, FIG. 1A provides an illustration of a non-volumetric video of a scene;

FIG. 2A illustrates a first part of generating of a composite video which contains a non-volumetric representation of the volumetric video in a spatial subregion of the non-volumetric video, namely the non-volumetric video being obtained as a spatially segmented encoding comprising independently decodable segments;

FIG. 2B shows spatial segments of the non-volumetric video which are at least partially occluded when the volumetric video is displayed in front of the non-volumetric video, and which may be replaced by, or removed while adding further segments, containing the non-volumetric representation of the volumetric video;

FIG. 5 illustrates data communication between a processor system configured for generating a composite video stream and a processor system configured for decoding and rendering the composite video stream in a VR environment;

FIG. 8 shows a method of generating the composite video stream;

FIG. 9 shows a method of rendering the composite stream;

FIG. 10 shows a computer-readable medium comprising non-transitory data;

Figure 1B:
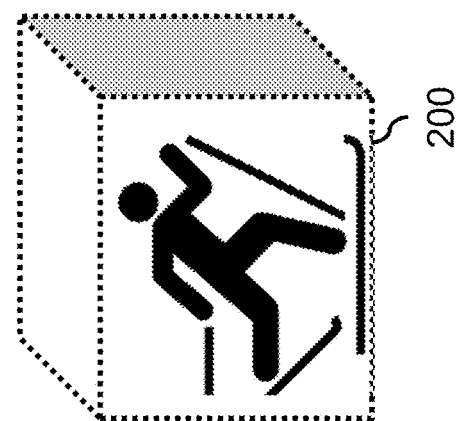
FIG. 1B provides an illustration of a volumetric video of an object.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

100 non-volumetric background video
110 spatially segmented encoding of non-volumetric video
120 spatial segments occluded by volumetric video
200 volumetric foreground video
300 3D volumetric video
305 3D to 2D mapping
310 2D representation of 3D volumetric video
315 tile and encode
320 tiled 2D representation of 3D volumetric video
330 2D panoramic video
335 tile and encode
340 tiled 2D panoramic video
345 user viewport
350 occlusion detection
355 tile replacement
360 generate signaling
365 composite video with signaling 400 composite video with signaling
410 signaling extraction
420 tile decoder
430 2D representation of 3D volumetric video
440 2D to 3D mapping
450 3D volumetric video
460 2D panoramic video
470 rendering of 2D panoramic video and 3D volumetric video
500 processor system for generating composite video stream
510 composite video stream
520 signaling data
530 network
540 processor system for rendering composite video stream
550 display data
560 head mounted display
600 processor system for generating composite video stream
610 network interface
612 network data communication
620 input interface
625 data storage
630 processor
700 processor system for rendering composite video stream
710 network interface
712 network data communication
720 processor
730 output interface
732 display data
735 display
800 method of generating composite video stream
810 obtaining non-volumetric video and volumetric video
820 determining spatial subregion in non-volumetric video
830 generating composite video stream
832 generating non-volumetric representation of volumetric video
834 replacing data of spatial subregion of non-volumetric video by data of non-volumetric representation of volumetric video
840 streaming composite video stream
845 providing signaling data
850 method of rendering composite video stream
860 receiving composite video stream
865 receiving signaling data
870 rendering composite video stream
872 decoding composite video stream
874 identifying non-volumetric representation of volumetric video
876 reconstructing volumetric video
878 rendering volumetric video in front of non-volumetric video
900 computer readable medium
910 non-transitory data
1000 exemplary data processing system
1002 processor
1004 memory element
1006 system bus
1008 local memory
1010 bulk storage device
1012 input device
1014 output device
1016 network adapter
1018 application

| 1000 | exemplary data processing system |
| 1002 | processor |
| 1004 | memory element |
| 1006 | system bus |
| 1008 | local memory |
| 1010 | bulk storage device |
| 1012 | input device |
| 1014 | output device |
| 1016 | network adapter |
| 1018 | application |

DETAILED DESCRIPTION OF EMBODIMENTS

The following embodiments relate to the generating and rendering of a composite video stream. Some embodiments are described within the context of spatially segmented streaming, e.g., 'tiled streaming' [4], [5], which may be used for the transmission of panoramic or omnidirectional videos, such as 360-degree videos. However, the techniques described in this specification may also be applied to any other type of streaming, including non-spatially segmented (non-tiled) streaming.

Some embodiments are described within the context of rendering the composite video stream in VR, such as a 'Social VR' virtual environment where a number of users may participate in a teleconference using Head Mounted Displays (HMDs) and cameras. However, the techniques described in this specification may also be applied in all other applications in which a volumetric video is to be displayed in front of a non-volumetric video and in which the volumetric video then covers ('occludes') a part of the non-volumetric video. A non-limiting example is the insertion of a volumetric video of an animated channel logo into a non-volumetric television program.

Some embodiments are described in which the non-volumetric video is a 2D video, while the volumetric video is a 3D video. It will be appreciated, however, that the techniques described in this specification may also be applied to non-volumetric 3D video, namely to stereoscopic 3D video. Also, the volumetric video may take different forms, including higher-dimensional video such as a 4D or 5D time-varying light field.

It is further noted that in the following, any reference to a 'video stream' may refer to a data representation of a video which is suitable for being streamed, e.g., using known streaming techniques. Furthermore, a reference to a 'video' may include a video stream but also a data representation of the video which is not (yet) suitable for being streamed or at least conventionally not intended for streaming. In the Figures, video (streams) may be schematically represented by a single video frame.

Figure 1A:
FIG. 1C shows a composition of the videos of FIGS. 1A and 1B, which may for example be generated by a client device receiving the non-volumetric video and the volumetric video, in which the volumetric video of the object is displayed in front of the non-volumetric video, thereby occluding a part of the non-volumetric video.
Figure 1C:
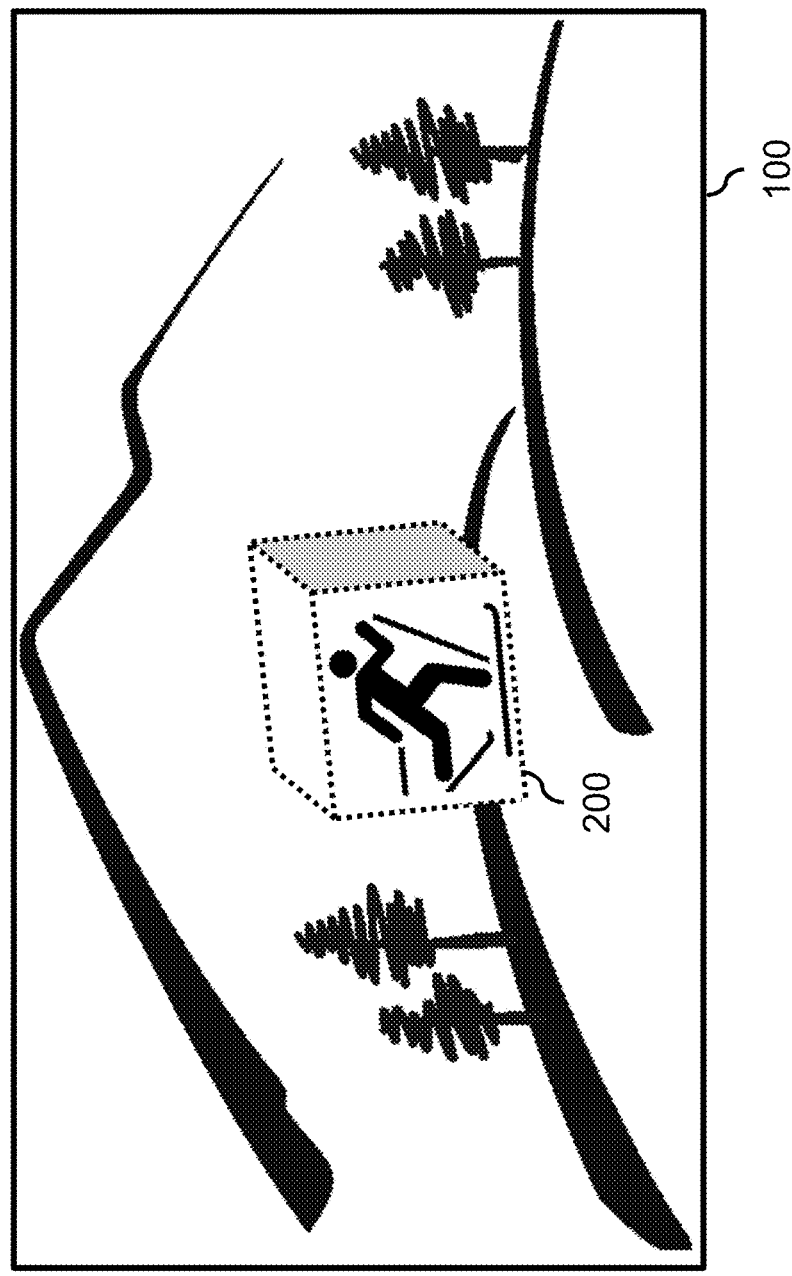

FIGS. 1A-1C illustrate the combined display of a volumetric video and a non-volumetric video. Here, FIG. 1A shows a non-volumetric video 100 which may represent a scene while FIG. 1B shows a volumetric video 200 which may represent an object which is to be shown in the scene. The volumetric video 200 may be a 3D video which is, for sake of illustration, shown in the form of a cubic image volume 200 while schematically indicating its semantic contents, e.g., a skier. As shown in FIG. 1C, both videos may then be jointly displayed by rendering the volumetric video 200 as a foreground object over the non-volumetric video 100 as a background.

It will be appreciated that while FIG. 1C shows the entire image volume of the volumetric video 200 being rendered over the non-volumetric video 100, the rendering may also be such that only a part of the image volume 200 is rendered, e.g., only the skier and not the skier's immediate surroundings within the cubic image volume. For example, if the volumetric video 200 is a volumetric video comprised of voxels, the rendering may omit rendering the surroundings of the skier on the basis of voxels surrounding the skier having been previously assigned a 100% transparency or 0% opacity. In another example in which the volumetric video 200 is a 3D point cloud, only the point cloud's points may be rendered while the non-volumetric video 100 in the background may remain visible in some spaces between the rendered points.

With continued reference to FIGS. 1A-1C, a composite video may be generated which combines the non-volumetric video 100 and the volumetric video 200 into a single video, and if encoded as a stream, into a single video stream. This may generally involve converting the volumetric video into a non-volumetric representation of the volumetric video, e.g., using techniques such as [8] in case the volumetric video is a 3D point cloud, and by identifying a spatial subregion in the non-volumetric video which is occluded by the volumetric video when the volumetric video is displayed in front of the non-volumetric video. The data of the non-volumetric video in the spatial subregion may then be replaced by data of the non-volumetric representation of the volumetric video. This may involve inserting the non-volumetric representation of the volumetric video into the spatial subregion in the non-volumetric video. In the specific case of the non-volumetric video being available as a spatially segmented encoding, such replacing may be carried out as described with reference to FIGS. 2A and 2B.

FIGS. 2A and 2B illustrates the generating of a composite video for a non-volumetric video which is obtained as, or converted into, a spatially segmented encoding 110 of the non-volumetric video. The spatially segmented encoding 110 may comprise so-called independently decodable spatial segments. For example, as spatial segments, so-called 'tiles' [4], [5] may be used which may subdivide a video frame into logically separate rectangular parts that may be decoded independently when decoding a given frame. The HEVC [5] standard defines the tile configuration for the entire frame as a homogenous regular grid, as also depicted by FIGS. 2A and 2B. The following may refer to spatial segments as 'tiles', with a reference to 'tiles' denoting spatial segments in general, not only tiles as defined by the HEVC standard, unless otherwise noted.

As previously indicated in FIG. 1C, the volumetric video 200 may occlude a spatial subregion of the non-volumetric video when the volumetric video is displayed in front of the non-volumetric video. In case the non-volumetric video is available as a spatially segmented encoding 110, the spatial subregion may be represented as a set of spatial segments 120 which are occluded by the volumetric video 200 during display. The spatial segments 120 may then be replaced by data of the non-volumetric representation of the volumetric video, for example by removing the set of spatial segments 120 from the spatially segmented encoding 110 of the non-volumetric video, and by encoding the non-volumetric representation of the volumetric video as one or more spatial segments. A composite video stream may then be generated to comprise the 'remaining' segments of the spatially segmented encoding 110 to which the one or more spatial segments of the non-volumetric representation of the volumetric video may be added. In an alternative embodiment, instead of removing the set of spatial segments 120 from the spatially segmented encoding 110, the spatially segmented encoding 110 may be directly generated without the set of spatial segments 120.

It will be appreciated that in some embodiments, only a part of a spatial segment may be occluded by the volumetric video 200. In such a case, it may not be desirable to omit the entire spatial segment, and instead, the spatial segment may remain in the composite video stream. Accordingly, only spatial segments may be removed which are entirely, to at least partially, occluded by the volumetric video. Here, 'partially' may refer to only a spatial part of the image data in the spatial segment being occluded, and/or to the occlusion reducing the visibility of the underlying non-volumetric data to a certain degree, e.g., due to transparency of the volumetric video. Alternatively, all spatial segments which are at least in part occluded may be omitted from the composite video stream. In general, a low-resolution representation of the non-volumetric video may substitute for the omitted parts of the non-volumetric video. Such low-resolution representations are also known as 'fallback layers'.

It is noted that the generating of the composite video may involve rewriting the bitstream of the spatially segmented encoding 110 of the non-volumetric video, e.g., in a manner as described in [6] and [7]. Such rewriting of the bitstream may, for example, comprise changing parameters in the bitstream, e.g. high-level syntax parameters, such as tile locations and dimensions in the Picture Parameter Set (PPS).

It will be appreciated that the segments representing the non-volumetric representation of the volumetric video may be encoded at a higher bitrate than the bitrate at which the segments of the non-volumetric video were or are encoded, or in general, at a higher quality level. For example, suitable values of quantization parameters (QP) may be selected to improve the quality. For example, in HEVC, QP values may range from 0-51 with the highest quality being 0. Such increase of quality may for example be specific to segments representing volumetric video containing image data of users as such image data may be watched with more attention.

Figure 3:
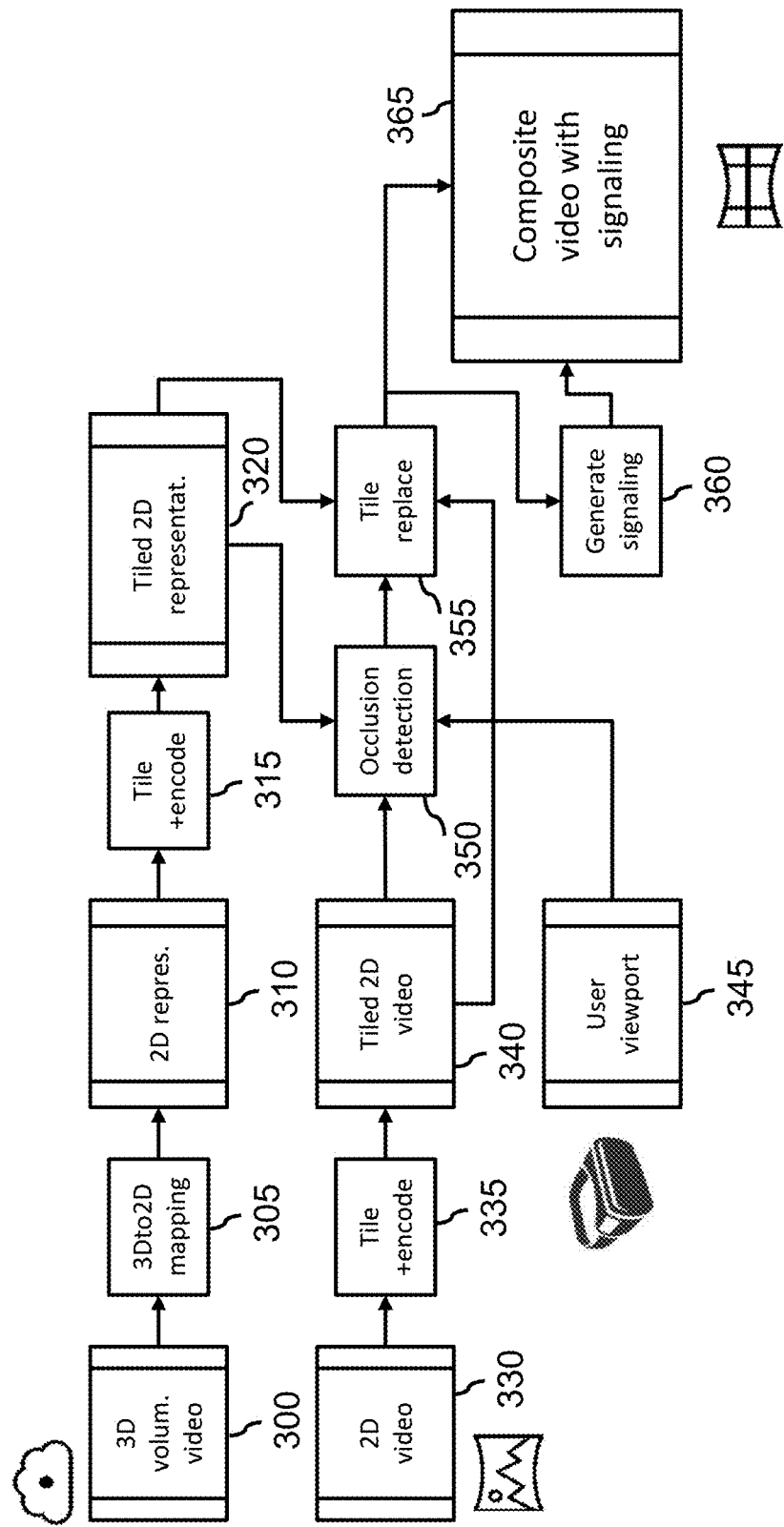
FIG. 3 shows steps of encoding a composite video stream which comprises a non-volumetric video and a non-volumetric representation of a volumetric video, wherein the non-volumetric representation may be inserted into a spatial subregion of the non-volumetric video, and wherein signaling data may be provided which may be indicative of the composite video stream containing the non-volumetric representation.
Figure 4:
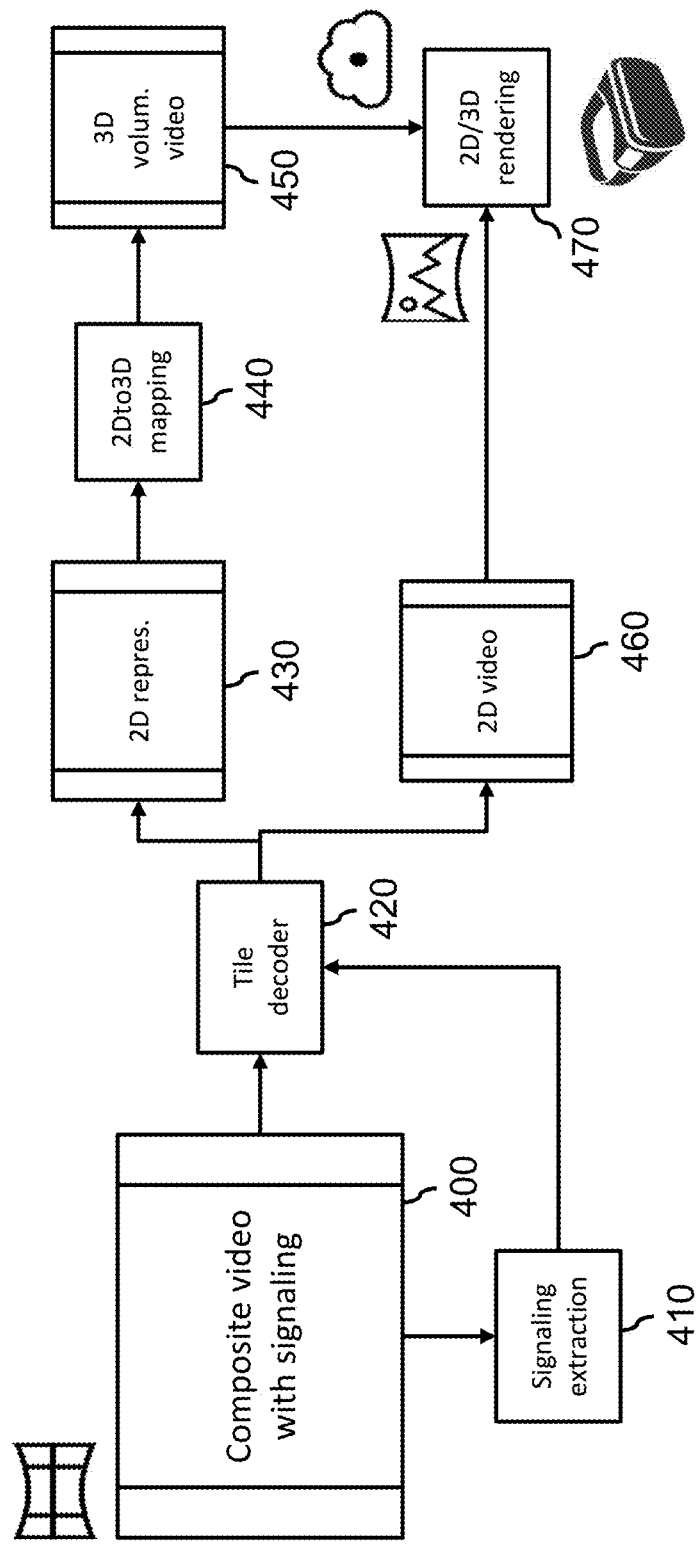
FIG. 4 shows steps of decoding and rendering a composite stream, which may for example be generated by the steps of FIG. 3, using signaling data.

FIGS. 3 and 4 show an encoding and subsequent decoding and rendering of a composite video stream, which is in this specific example generated as a tiled composite video stream as also described with reference to FIGS. 2A and 2B. In this example, the non-volumetric video is a 2D panoramic video and the volumetric video is a 3D volumetric video, or simply '3D video'. Although the steps illustrated by FIGS. 3 and 4 are described in a particular order, the steps may be performed in any suitable order, e.g., consecutively, simultaneously, or a combination thereof, subject to, where applicable, a particular order being necessitated, e.g., by input/output relations.

FIG. 3 illustrates the encoding of a composite video stream. Here, a 3D volumetric video 300 may be obtained, which may be converted into a non-volumetric (2D) representation of the 3D video using a conversion technique which is indicated in FIG. 3 as a '3D to 2D mapping' 305, thereby obtaining a 2D representation 310 of the 3D video. The 2D representation 310 may be tiled and encoded 315, thereby obtaining a tiled and encoded 2D representation 320 of the 3D video. Furthermore, a 2D panoramic video 330 may be obtained, which may be tiled and encoded 335, thereby obtaining a tiled 2D video 340. Occlusion detection 350 may be performed, which may take into account the user's viewport 345, as also described elsewhere in this specification. Occluded tiles of the tiled 2D video 340 may be replaced 355 by tiles of the tiled 2D representation 320 of the 3D video, thereby obtaining a composite video stream. Signaling data may be generated 360 to indicate that the composite video stream comprises tiles of the tiled 2D representation 320. The signaling data may be included in the composite video stream, yielding a composite video stream with signaling data 365. For example, Supplemental Enhancement Information (SEI) messages may be included in the bitstream to indicate the tile type, e.g., non-volumetric video or a non-volumetric representation of a volumetric video.

FIG. 4 shows a decoding and rendering of the composite video stream of FIG. 3, which is in FIG. 4 indicated by reference numeral 400. The signaling data may be extracted 410 from the composite video stream. Using the signaling data, tiles of the composite video stream may be decoded 420 to obtain data of the 2D representation 430 of the 3D video, and data of the 2D video 460. The former may be used as input to a reconstruction technique which is indicated in FIG. 4 as a '2D to 3D mapping' 440, thereby obtaining a reconstruction of the 3D volumetric video 450. Both the 2D video 460 and the reconstructed 3D volumetric video 450 may then be rendered, e.g., in a VR-based virtual environment which may be displayed to a user using an HMD.

FIG. 5 illustrates data communication between a processor system 500 configured for generating a composite video stream and a processor system 540 configured for rendering the composite video stream, being in this example a rendering in a Virtual Reality (VR) environment. In general, the processor system 500 may represent an entity generating the composite video stream 510 as also described elsewhere, e.g., with reference to FIGS. 1A-4 and FIG. 6. The processor system 500 may also be referred to as 'encoder system' and may be embodied by, for example, a server or a distributed system of servers. The processor system 540 may represent an entity decoding and rendering the composite video stream 510 as also described elsewhere, e.g., with reference to FIGS. 1A-4 and FIG. 7. The processor system 540 may also be referred to as 'receiver system' and may be embodied by a client device, such as for example a computer, console, smartphone or tablet device.

The processor system 500, which may for example be a cloud-based server, may generate and stream the composite video stream 510 to the processor system 540, e.g., via a network 530 such as the Internet and/or an access network and/or core network of a telecommunication network. Upon receiving the composite video stream 510, the processor system 540 may establish a visual rendering of a VR environment in which the non-volumetric video and the reconstructed volumetric video may be displayed. The processor system 540 may then output rendered image data as display data 550 to an HMD 560 worn by a user. Before or during the streaming of the composite video stream 510, the processor system 500 may provide signaling data 520 to the processor system 540 which may indicate that the composite video stream 510 contains the non-volumetric representation of the volumetric video. This may effectively signal the processor system 540 that the volumetric video may be reconstructed by the processor system 540 from data contained in the composite video stream 510.

Conversion and Reconstruction

To obtain a conversion from a volumetric video to a non-volumetric representation of the volumetric video, and a reconstruction of the volumetric video from its non-volumetric representation, various techniques may be used. For example, for 3D point clouds, the techniques described in [8] may be used which may involve segmenting the 3D point cloud on the basis of a given feature, for example a planar feature. The color information of the 3D point cloud may then be 'unwrapped' to obtain 2D image data, and the depth information may be extracted as a depth map which may also be represented as 2D image data. Both 2D image data parts may be included the composite video. At the receiver, e.g., at a client device, the 3D point cloud may then be reconstructed using included the depth map and the color information.

Another example of a volumetric video which may be included in the composite video is a light field, which may be considered a form of volumetric video which describes incoming light from all directions at a given sample point. A light field may be represented by a 2D rectangular grid of 2D images. Similarly, a time-varying light field may be represented by a 2D rectangular grid of 2D videos [9]. Such a 2D grid of 2D videos may thus be considered as a 2D video-based representation of a light field. The formatting of the light field as a 2D rectangular grid of 2D videos may be considered a conversion of the light field into a non-volumetric representation thereof. The rendering of the light field based on the 2D rectangular grid of 2D videos may be considered a reconstruction of the light field from its non-volumetric representation.

Various other types of volumetric videos exist, as well as conversion techniques to obtain a non-volumetric representation thereof and reconstruction techniques to reconstruct the volumetric video from its non-volumetric representation.

Identifying the Spatial Subregion

The spatial subregion of the non-volumetric video which is occluded by the volumetric video during display may be detected in various ways. For example, if both videos are rendered in a 3D graphics-based environment, occlusion may be detected using known 3D graphics culling techniques. For example, a common method for performing 3D graphics culling uses a mixed GPU/CPU approach to implement the Hierarchical Z-Buffer (HZB) occlusion culling algorithm, e.g., as described in the publication "Hierarchical Z-Buffer Visibility" by Ned Greene et al., 1993. The output of the HZB occlusion culling algorithm may be regarded as a grid-based representation of the output buffer (e.g., the screen or window) where for each pixel it is indicated whether it is occluded or not. To determine whether, and if so, which parts of a video in the 3D graphics-based environment are occluded, the pixels corresponding to the bounding area (e.g., bounding box or sphere) of the video may be considered in the HZB occlusion culling algorithm, while disregarding all pixels outside this bounding area. Next, a polygon may be reconstructed of the occluded area indicated by the HZB culling algorithm (e.g. using Chan's algorithm as known from the field of computational geometry). This polygon may be used as a basis for identifying the spatial subregion in which the data of the non-volumetric data is to be replaced. In some embodiments, the polygon may also be included in the signaling data to identify the spatial subregion.

Another option is that raytracing techniques may be used, in which it is detected which parts of objects are not hit by viewing rays and therefore are determined to be occluded. In general, various types of data characterizing the relationship between the non-volumetric background video and the volumetric foreground video may be used to determine which part of the non-volumetric background video is occluded. It is noted that such data may be present at a processor system representing the client device, but in some embodiments also at another entity, such as a processor system generating the composite video stream. For example, the latter processor system may be aware of the relation between the non-volumetric video and the volumetric video as it may, at least in part, determine this relation, for example in a client-server context in which a server knows the geometry of the scene rendered by a client device. Another example is that the processor system generating the composite video stream may obtain this data as signaling data from the client device.

In some embodiments, the display position of the volumetric video relative to the non-volumetric video may be predetermined. Such a predetermined display position may directly or indirectly indicate the spatial subregion which is occluded by the volumetric video during display. For example, in multi-user communication, including the aforementioned Social VR use cases, volumetric foreground videos may be inserted at particular positions relative to a non-volumetric background video. These positions may also be referred to as 'placement positions', and may indicate which spatial subregion of the non-volumetric background video is occluded. Such placement position of the volumetric video may be defined by metadata, which is also referred to as placement metadata. The placement metadata may be associated with the non-volumetric video. For example, the placement metadata may be part of a same data container as the non-volumetric video, for example a same file or media stream, but may also be provided as separate metadata which can be associated with the non-volumetric video. For example, the metadata may contain an identifier of the data container of the non-volumetric video, such as an URL, thereby allowing the metadata to be retrieved and associated with the background video. Yet another example is that the metadata may be included in a manifest file which is associated with the non-volumetric video, or that it may be included in a service announcement.

It is noted that the spatial subregion which is occluded may be predicted, in that occlusion may not yet occur but may be predicted to occur in the (near) future.

Signaling Data

There are various options for generating signaling data which is indicative of the composite video stream containing the non-volumetric representation of the volumetric video. The generated signaling data may thereby directly or indirectly indicate that the composite video stream contains the non-volumetric representation of the volumetric video. For example, Supplemental Enhancement Information (SEI) messages may be used to, on a tile-by-tile basis, signal which type of data a particular tile contains, e.g., data of the non-volumetric video or data of the non-volumetric representation of the volumetric video. Instead of further referring to tiles, the following examples refer to a 'spatial region'. It will be appreciated that such a spatial region may be or comprise one or more spatial segments, or specifically one or more tiles.

SEI messages may be compatible with HEVC decoders, and may thus be combined with a region-based approach to generate the composite video bitstream. In a specific example, a 'volumetric region content type description' may be included in a SEI message for specific regions that contain volumetric video data. For example, the SEI message may be defined to contain a content type identifier identifying a region's content as either 1) 2D video, 2) point cloud, 3) light field or 4) other. Regions of content types 2-4 may be further described with metadata, for example containing depth, texture or color or an occupancy map.

An example of a SEI message syntax may be the following:

| | Descriptor |
|---|---|
| region_content_type(payloadSize ) { | |
|   region_type | ue(v) |
|   top_left_corner | ue(v) |
|   bottom_right_corner | ue(v) |
|   if(content_type == 2) { | |
|     pcc_content_type | u(5) |
|   } | |
| } | | wherein:
region_type: describes the region content type (e.g. 2D video, point cloud, light field, other).
top left corner: top left position in luma sample coordinate of data with respect to the width and the height of the video sequence
bottom_right_corner bottom right position in luma sample coordinate of data with respect to the width and the height of the video sequence
pcc_content_type: metadata that describes the type of point cloud data.

It will be appreciated that the descriptor field sizes described in this table are mentioned as examples and may differ depending on the application.

Another example is the use of Network Abstraction Layer (NAL) information, for example using header information as described with table 11 of WO2018/011042 A1 (herewith incorporated by reference in as far as pertaining to the syntax of the nal_unit_header) but with the TPS NAL unit with a given nuh_tile_id providing the properties of the given tile content type unit (instead of, as described by WO2018/011042A1, providing properties of a given tile positioning unit).

In case of NAL, the SEI message syntax may be the following:

| | Descriptor |
|---|---|
| region_content_type(payloadSize ) { | |
|   region_type | ue(v) |
|   tile_id | ue(v) |
|   if(content_type == 2) { | |
|     pcc_content_type | u(5) |
|   } | |
| } | | wherein:
Tile_id: value corresponding to the 'nuh_tile_id' of the tile that the SEI message describes (tile as defined in the context of WO2018/011042 A1)

Yet another option is including the signaling information in a manifest of a tiled composited video stream, such as a MPEG DASH SRD manifest. As an example, the processor system generating the composite video stream may receive or have access to a manifest of the non-volumetric video and a manifest of the non-volumetric representation of the volumetric video, e.g., as respective manifest files. The latter manifest may have been generated by the processor system when generating the non-volumetric representation of the volumetric video, or may have been generated by another entity and may be accessed by the processor system. Examples of such manifests include, but are not limited to, MPEG DASH SRD manifest files. From these manifests, a modified manifest may be created which may include references to spatial segments that contain the non-occluded parts of the non-volumetric video and references to spatial segments that contain the non-volumetric representation of the volumetric video. In such a manifest, spatial segments from the non-volumetric video which are occluded by the volumetric video during rendering may not be listed.

General

In general, for example in multi-user communication, a volumetric video may be obtained by a 2D camera and a depth camera or by a 3D camera.

In multi-user communication, the functionality of the processor system generating the composite video stream may be implemented by one of the client devices. Effectively, such a client device may also 'act' as server.

In some embodiments, the non-volumetric video and the non-volumetric representation of the volumetric video may be tiled separately, e.g. in the uncompressed domain, occlusion detection may be performed, occluded tiles in the non-volumetric video may be detected and replaced by tiles of the non-volumetric representation of the volumetric video, and joint encoding of the resulting tiled video frames may take place. In some embodiments, a spatial dimension of the tiled non-volumetric video may be extended so as to enable all tiles of the non-volumetric representation of the volumetric video to be included in the resulting video stream.

Figure 6:
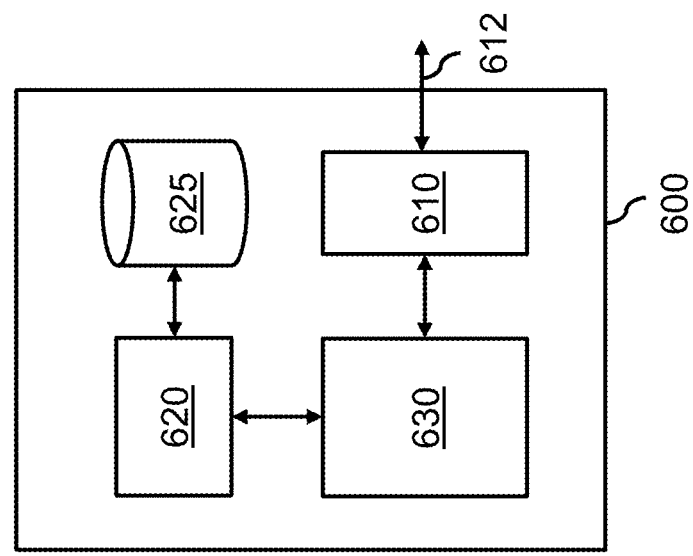
FIG. 6 shows a processor system which may be configured for generating a composite video stream for transmission to a client device.

FIG. 6 shows a processor system 600 for generating a composite video stream. For that purpose, the processor system 600 is shown to comprise a processor 630 which may be configured, e.g., by hardware design or software, to perform operations described with reference to FIGS. 1A-5 and elsewhere pertaining to the generating of a composite video stream and the generating of the signaling data. For example, the processor 630 may be embodied by a single Central Processing Unit (CPU), but also by a combination or system of such CPUs and/or other types of processing units. The processor system 600 is further shown to comprise a data storage 625, such as internal memory, a hard disk, a solid-state drive, or an array thereof, which may be used to store or buffer data such as the volumetric video and the non-volumetric video, and/or to buffer any received video streams representing said videos. The processor system 600 is further shown to comprise an input interface 620 to the data storage 625, which may be any suitable type of interface, e.g., an internal storage interface such as a memory interface or a solid-state drive interface. In some embodiments, the data storage 625 may be an external data storage 625, and the input interface 620 may be an interface to the external storage, such as a USB interface or a network interface. In some embodiments, the input interface 620 may be the same network interface as the network interface 610 described in the following.

FIG. 6 further shows the processor system 600 to comprise a network interface 610, which may be any suitable type of network interface via which the composite video stream and the signaling data may be transmitted, both types of data being indicated by reference numeral 612. For example, the network interface 610 may be a wireless network interface, e.g., based on Wi-Fi, Bluetooth, ZigBee, 4G or 5G mobile communication, or a wired network interface, e.g., based on Ethernet or optical fiber. For example, the network interface 610 may be a local area network (LAN) network interface or an interface to wide area network (WAN) such as the Internet.

The processor system 600 may be embodied by a (single) device or apparatus. For example, the processor system 600 may be embodied by a server, workstation, personal computer, etc. In some embodiments, the processor system 600 may be an end-user device, for example (integrated into) a same type of device as described with reference to FIG. 7 which is configured for rendering the composite video stream. Examples of such devices include, but are not limited to a smartphone, personal computer, laptop, tablet device, gaming console, set-top box, television, monitor, projector, smart watch, smart glasses, media player, media recorder, head mounted display device, etc. The processor system 600 may also be embodied by a distributed system of such devices or apparatuses. An example of the latter may be the functionality of the processor system 600 being at least in part distributed over network elements in a network. In another example, the processor system 600 may be embodied by an edge node of a 5G or next-gen telecommunication network, or in general by a network processing node of a telecommunication network.

Figure 7:
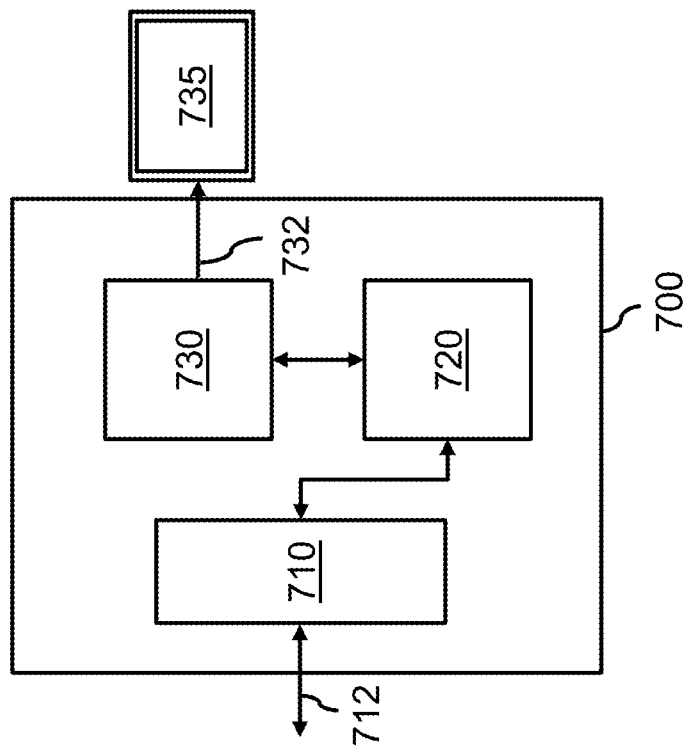
FIG. 7 shows a processor system which may represent the client device and which may be configured to decode and render the composite video stream.

FIG. 7 shows a processor system 700 configured for rendering the composite video stream. The processor system 700 may implement part or all of the 'decode', 'render' and/or 'display' functionality as described with reference to FIGS. 1-5 and elsewhere. The processor system 700 is shown to comprise a network interface 710 which may be configured to receive a composite video stream and signaling data, both types of data being indicated by reference numeral 712. The network interface 710 may be any suitable type of interface for receiving and/or transmitting said data, including but not limited to a type of network interface as described with reference to FIG. 6. The processor system 700 may further comprise a processor 720 which may be configured, e.g., by hardware design or software, to perform operations described with reference to FIGS. 1A-5 and elsewhere pertaining to the decoding and rendering of the composite video stream. In some embodiments, the processor 720 may directly generate and output display data 732 representing rendered image data to a display 735 such as an HMD. In other embodiments, the processor 720 may output rendered image data which may be output to the display 735 by an output interface 730.

The processor 720 may be embodied by a single Central Processing Unit (CPU), but also by a combination or system of such CPUs and/or other types of processing units, such as Graphics Processing Units (GPUs). Although not shown in FIG. 7, the processor system 700 may also comprise a data storage, such as internal memory, a hard disk, a solid-state drive, or an array thereof, which may be used to buffer data, e.g., the received composite video stream and/or the signaling data. The processor system 700 may be embodied by a (single) device or apparatus. For example, the processor system 700 may be embodied as smartphone, personal computer, laptop, tablet device, gaming console, set-top box, television, monitor, projector, smart watch, smart glasses, media player, media recorder, head mounted display device, etc. The processor system 700 may also be embodied by a distributed system of such devices or apparatuses.

In general, the processor system 600 of FIG. 6 and the processor system 700 of FIG. 7 may each be embodied as, or in, a device or apparatus. The device or apparatus may comprise one or more (micro)processors which execute appropriate software. The processors of either system may be embodied by one or more of these (micro)processors. Software implementing the functionality of either system may have been downloaded and/or stored in a corresponding memory or memories, e.g., in volatile memory such as RAM or in non-volatile memory such as Flash. Alternatively, the processors of either system may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of either system may be implemented in the form of a circuit. It is noted that either system may also be implemented in a distributed manner. e.g., involving different devices.

FIG. 8 shows a computer-implemented method 800 for generating a composite video stream. The method 800 may comprise, in a step titled "OBTAINING NON-VOLUMETRIC VIDEO AND VOLUMETRIC VIDEO", obtaining 810 a non-volumetric video, as well as a volumetric video, at least part of which is to be displayed by the client device in front of the non-volumetric video. The method 800 may further comprise, in a step titled "DETERMINING SPATIAL SUBREGION IN NON-VOLUMETRIC VIDEO", determining 820 a spatial subregion of the non-volumetric video which is partially or entirely occluded when the volumetric video is displayed by the client device in front of the non-volumetric video. The method 800 may further comprise, in a step titled "GENERATING COMPOSITE VIDEO STREAM", generating 830 a composite video for the client device by, for respective input frames of the non-volumetric video and the volumetric video and in a step titled "GENERATING NON-VOLUMETRIC REPRESENTATION OF VOLUMETRIC VIDEO", generating 832 a non-volumetric representation of the volumetric video using a conversion technique which allows the volumetric video to be reconstructed from the non-volumetric representation, and in a step titled "REPLACING DATA OF SPATIAL SUBREGION OF NON-VOLUMETRIC VIDEO BY DATA OF NON-VOLUMETRIC REPRESENTATION OF VOLUMETRIC VIDEO", replacing 834 data of the spatial subregion of the non-volumetric video by data of the non-volumetric representation of the volumetric video, thereby obtaining an output frame of the composite video. The method 800 may further comprise, in a step titled "STREAMING COMPOSITE VIDEO STREAM", streaming 840 the composite video as a composite video stream, or streaming select spatial segments of the composite video stream, to the client device. The method 800 may further comprise, in a step titled "PROVIDING SIGNALING DATA", providing 845 signaling data to the client device which is indicative of the composite video stream containing the non-volumetric representation of the volumetric video.

FIG. 9 shows a computer-implemented method 850 for rendering a volumetric video in front of a non-volumetric video. The method 850 may comprise, in a step titled "RECEIVING COMPOSITE VIDEO STREAM", receiving 860 a composite video stream containing the non-volumetric video, or select spatial segments of the composite video stream. The method 850 may further comprise, in a step titled "RECEIVING SIGNALING DATA", receiving 885 signaling data which is indicative of the composite video stream containing a non-volumetric representation of the volumetric video in a spatial subregion of the non-volumetric video. The method 850 may further comprise, in a step titled "RENDERING COMPOSITE VIDEO STREAM", rendering 870 the composite video stream by, for a respective input frame of the composite video stream and in a step titled "DECODING COMPOSITE VIDEO STREAM", decoding 872 the composite video stream, or the select spatial segments of the composite video stream. The rendering 870 may further comprise, in a step titled "IDENTIFYING NON-VOLUMETRIC REPRESENTATION OF VOLUMETRIC VIDEO", on the basis of the signaling data, identifying 874 the non-volumetric representation of the volumetric video in the input frame, and in a step titled "RECONSTRUCTING VOLUMETRIC VIDEO", reconstructing 876 the volumetric video from the non-volumetric representation of the volumetric video using a reconstruction technique. The rendering 870 may further comprise, in a step titled "RENDERING VOLUMETRIC VIDEO IN FRONT OF NON-VOLUMETRIC VIDEO", rendering 878 the volumetric video in front of the non-volumetric video so that the spatial subregion of the non-volumetric video is partially or entirely occluded by the volumetric video.

It will be appreciated that, in general, the operations of method 800 of FIG. 8 and/or method 850 of FIG. 9 may be performed in any suitable order, e.g., consecutively, simultaneously, or a combination thereof, subject to, where applicable, a particular order being necessitated, e.g., by input/output relations.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 900 as for example shown in FIG. 10, e.g., in the form of a series 910 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 10 shows by way of example an optical storage device 900.

In an alternative embodiment of the computer readable medium 900 of FIG. 10, the computer readable medium 900 may comprise transitory or non-transitory data 910 represent the signaling data or placement metadata described in this specification.

Figure 11:
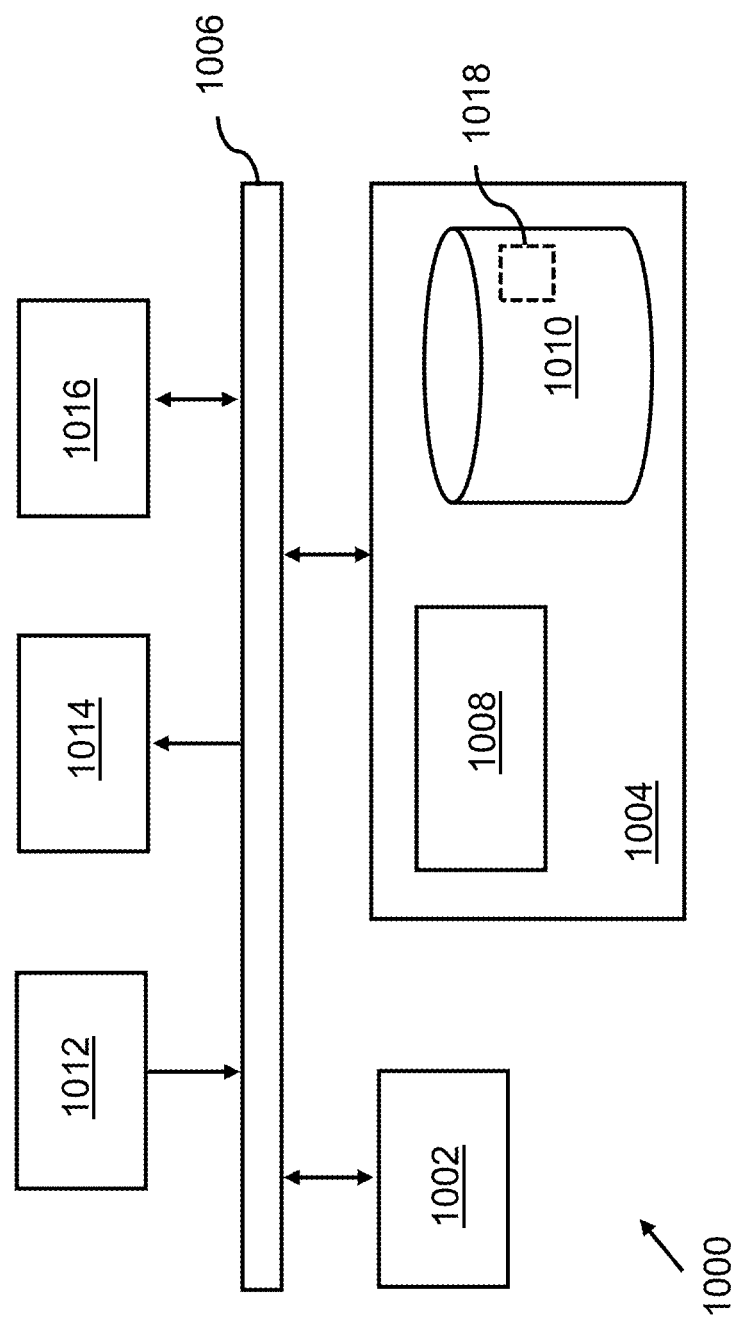
FIG. 11 shows an exemplary data processing system.

FIG. 11 is a block diagram illustrating an exemplary data processing system 1000 that may be used in the embodiments described in this specification. Such data processing systems include data processing entities described in this specification, including but not limited to the processor systems, servers and client devices as described with reference to FIGS. 1-7 and elsewhere, and others.

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 11, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a processor system or entity configured for generating the composite video stream, e.g., as described with reference to FIGS. 1-6. In that case, application 1018 may represent an application that, when executed, configures data processing system 1000 to perform the functions described with reference to said processor system or entity.

In another example, data processing system 1000 may represent a processor system or entity configured for rendering the composite video stream, e.g., as described with reference to FIGS. 1-7. In that case, application 1018 may represent an application that, when executed, configures data processing system 1000 to perform the functions described with reference to said processor system and/or entity.

In the claims, any reference signs placed between parentheses shall not be construed as limiting the claim. Use of the verb "comprise" and its conjugations does not exclude the presence of elements or steps other than those stated in a claim. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A processor system configured for generating a composite video stream for transmission to a client device, the processor system comprising:
   a network interface to a network;
   an input interface for obtaining:
      a non-volumetric video; and
      a volumetric video, at least part of which is to be displayed by the client device in front of the non-volumetric video;
   a processor configured to:
      determine a spatial subregion of the non-volumetric video which is partially or entirely occluded when the volumetric video is displayed by the client device in front of the non-volumetric video; and
      generate a composite video for the client device by, for respective input frames of the non-volumetric video and the volumetric video:
         obtaining a non-volumetric representation of the volumetric video which is generated using a conversion technique for enabling the volumetric video to be reconstructed from the non-volumetric representation;
         replacing data of the spatial subregion of the non-volumetric video by data of the non-volumetric representation of the volumetric video, thereby obtaining an output frame of the composite video;
   and via the network interface:
      stream the composite video as a composite video stream, or stream select spatial segments of the composite video stream, to the client device; and
      provide signaling data to the client device that is indicative of the composite video stream containing the non-volumetric representation of the volumetric video.

2. The processor system according to claim 1, wherein the non-volumetric video is obtained as, or converted into, a spatially segmented encoding comprising independently decodable segments, and wherein the processor is further configured to:
   determine the spatial subregion as a set of segments of the non-volumetric video which are occluded when the volumetric video is displayed by the client device in front of the non-volumetric video;
   encode the non-volumetric representation of the volumetric video as one or more independently decodable segments; and
   remove the set of segments from the spatially segmented encoding of the non-volumetric video, and add the one or more segments to the spatially segmented encoding of the non-volumetric video, to obtain a spatially segmented encoding of the output frame of the composite video stream.

3. The processor system according to claim 2, wherein the processor is further configured to generate the signaling data to identify the set of segments as containing the non-volumetric representation of the volumetric video.

4. The processor system according to claim 3, wherein the processor is further configured to include the signaling data in the composite video stream, for example as a Supplemental Enhancement Information (SEI) message.

5. The processor system according to claim 1, wherein the client device is configured to render the composite video stream in a Virtual Reality (VR) or Augmented Reality (AR)

environment and to render the VR/AR environment from a viewing position of a user, wherein the processor is further configured to:

determine the viewing position of the user by receiving data indicative of the viewing position from the client device; and determine the spatial subregion by determining which spatial subregion of the volumetric video is partially or entirely occluded by the volumetric video when the volumetric video is displayed in front of the non-volumetric video in the VR/AR environment and rendered by the client device from the viewing position.

6. The processor system according to claim 1, wherein the volumetric video is a 3D point cloud, and wherein the conversion technique by which the non-volumetric representation of the volumetric video is generated is a point cloud compression technique.

7. The processor system according to claim 1, wherein the non-volumetric video is a panoramic or omnidirectional video.

8. The processor system of claim 1, wherein the signaling data indicative of the composite video stream containing a non-volumetric representation of a volumetric video is stored in a non-transitory computer-readable medium.

9. The processor system of claim 8, wherein the composite stream is a spatially segmented encoding which comprises independently decodable segments, and wherein the signaling data identifies a set of segments of the spatially segmented encoding.

10. A processor system representing a client device configured to render a volumetric video in front of a non-volumetric video, the processor system comprising:

a network interface to a network;

a processor configured to, via the network interface:

receive a composite video stream containing the non-volumetric video, or select spatial segments of the composite video stream;

receive signaling data that is indicative of the composite video stream containing a non-volumetric representation of the volumetric video in a spatial subregion of the non-volumetric video;

the processor being further configured to render the composite video stream by, for a respective input frame of the composite video stream:

decoding the composite video stream, or the select spatial segments of the composite video stream;

on the basis of the signaling data, identifying the non-volumetric representation of the volumetric video in the input frame;

reconstructing the volumetric video from the non-volumetric representation of the volumetric video using a reconstruction technique; and rendering the volumetric video in front of the non-volumetric video so that the spatial subregion of the non-volumetric video is partially or entirely occluded by the volumetric video.

11. The processor system according to claim 10, wherein:

the composite video stream is received as a spatially segmented encoding which comprises independently decodable segments; and the processor is further configured to identify the non-volumetric representation of the volumetric video in the composite video stream based on the signaling data identifying a set of segments of the spatially segmented encoding.

12. The processor system according to claim 10, wherein the processor is further configured to:

render the composite video stream in a Virtual Reality (VR) or Augmented Reality (AR) environment; and render the VR/AR environment from a viewing position of a user.

13. The processor system according to any one of claim 10, wherein the volumetric video is a 3D point cloud, and wherein the conversion technique by which the non-volumetric representation of the volumetric video is generated is a point cloud compression technique.

14. The processor system according to any one of claim 10, wherein the non-volumetric video is a panoramic or omnidirectional video.

15. A computer-implemented method for generating a composite video stream for transmission to a client device, the method comprising:

obtaining:

a non-volumetric video; and a volumetric video, at least part of which is to be displayed by the client device in front of the non-volumetric video;

determining a spatial subregion of the non-volumetric video which is partially or entirely occluded when the volumetric video is displayed by the client device in front of the non-volumetric video;

generating a composite video for the client device by, for respective input frames of the non-volumetric video and the volumetric video:

obtaining a non-volumetric representation of the volumetric video which is generated using a conversion technique which allows the volumetric video to be reconstructed from the non-volumetric representation;

replacing data of the spatial subregion of the non-volumetric video by data of the non-volumetric representation of the volumetric video, thereby obtaining an output frame of the composite video;

streaming the composite video as a composite video stream, or streaming select spatial segments of the composite video stream, to the client device; and providing signaling data to the client device that is indicative of the composite video stream containing the non-volumetric representation of the volumetric video.

16. A computer-implemented method for rendering a volumetric video in front of a non-volumetric video, the method comprising:

receiving a composite video stream containing the non-volumetric video, or select spatial segments of the composite video stream;

receiving signaling data that is indicative of the composite video stream containing a non-volumetric representation of the volumetric video in a spatial subregion of the non-volumetric video;

rendering the composite video stream by, for a respective input frame of the composite video stream:

decoding the composite video stream, or the select spatial segments of the composite video stream;

on the basis of the signaling data, identifying the non-volumetric representation of the volumetric video in the input frame;

reconstructing the volumetric video from the non-volumetric representation of the volumetric video using a reconstruction technique; and rendering the volumetric video in front of the non-volumetric video so that the spatial subregion of the non-volumetric video is partially or entirely occluded by the volumetric video.

17. A non-transitory computer-readable medium having instructions stored thereon for generating a composite video stream for transmission to a client device, wherein the instructions, when executed by a processor of a processor system, cause the processor system to carry out operations including:
- obtaining:
  - a non-volumetric video; and
  - a volumetric video, at least part of which is to be displayed by the client device in front of the non-volumetric video;
- determining a spatial subregion of the non-volumetric video which is partially or entirely occluded when the volumetric video is displayed by the client device in front of the non-volumetric video;
- generating a composite video for the client device by, for respective input frames of the non-volumetric video and the volumetric video:
  - obtaining a non-volumetric representation of the volumetric video which is generated using a conversion technique which allows the volumetric video to be reconstructed from the non-volumetric representation;
  - replacing data of the spatial subregion of the non-volumetric video by data of the non-volumetric representation of the volumetric video, thereby obtaining an output frame of the composite video;
- streaming the composite video as a composite video stream, or streaming select spatial segments of the composite video stream, to the client device; and
- providing signaling data to the client device that is indicative of the composite video stream containing the non-volumetric representation of the volumetric video.

18. A non-transitory computer-readable medium having instructions stored thereon for rendering a volumetric video in front of a non-volumetric video, wherein the instructions, when executed by a processor of a client device, cause the client device to carry out operations including:
- receiving a composite video stream containing the non-volumetric video, or select spatial segments of the composite video stream;
- receiving signaling data that is indicative of the composite video stream containing a non-volumetric representation of the volumetric video in a spatial subregion of the non-volumetric video;
- rendering the composite video stream by, for a respective input frame of the composite video stream:
  - decoding the composite video stream, or the select spatial segments of the composite video stream;
  - on the basis of the signaling data, identifying the non-volumetric representation of the volumetric video in the input frame;
  - reconstructing the volumetric video from the non-volumetric representation of the volumetric video using a reconstruction technique; and
  - rendering the volumetric video in front of the non-volumetric video so that the spatial subregion of the non-volumetric video is partially or entirely occluded by the volumetric video.

\* \* \* \* \*